US012811703B2

(12) United States Patent
Wang et al.

(10) Patent No.: US 12,811,703 B2
(45) Date of Patent: Nov. 24, 2026

(54) INTEGRATED SENSING AND COMMUNICATION CHANNEL MODELING METHOD COMBINING FORWARD SCATTERING AND BACKWARD SCATTERING

(71) Applicant: SOUTHEAST UNIVERSITY, Nanjing (CN)

(72) Inventors: Chengxiang Wang, Nanjing (CN); Runruo Yang, Nanjing (CN); Jie Huang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 261 days.

(21) Appl. No.: 18/681,777

(22) PCT Filed: Apr. 7, 2023

(86) PCT No.: PCT/CN2023/086752

§ 371 (c)(1),
(2) Date: Feb. 6, 2024

(87) PCT Pub. No.: WO2024/001397

PCT Pub. Date: Jan. 4, 2024

(65) Prior Publication Data

US 2024/0372638 A1 Nov. 7, 2024

(30) Foreign Application Priority Data

Jun. 27, 2022 (CN) ......................... 202210741508.1

(51) Int. Cl.
*H04B 17/391* (2015.01)
*G01S 7/00* (2006.01)
*G01S 13/86* (2006.01)

(52) U.S. Cl.
CPC .......... *H04B 17/3912* (2015.01); *G01S 7/006* (2013.01); *G01S 13/86* (2013.01)

(58) Field of Classification Search
CPC ..... H04B 17/3912; G01S 7/006; G01S 13/86; G01S 5/0273; G01S 15/8915
(Continued)

(56) References Cited

U.S. PATENT DOCUMENTS 6,614,860 B1 * 9/2003 Piirainen .................. H04B 7/01 455/63.1
9,002,378 B2 * 4/2015 Levin .................... H04W 4/029 342/461
(Continued)

FOREIGN PATENT DOCUMENTS

CN 112235044 A 1/2015
CN 109639378 A * 4/2019 ........... H04B 17/391
(Continued)

*Primary Examiner* — Nuzhat Pervin
(74) *Attorney, Agent, or Firm* — MUNCY, GEISSLER, OLDS & LOWE, P.C.

(57) ABSTRACT

An integrated sensing and communication channel modeling method combining forward scattering and backward scattering includes the following steps: setting application scenarios and antenna parameters; estimating channel state information through a mono-static sensing means, and determining positions of a communication terminal and positions and motion information of scatterers that are backward scattered in environment; dividing non-line-of-sight paths of the communication channel into forward scattering paths and backward scattering paths based on whether the scatterers can be sensed by a sensing channel, generating forward scattering paths by adopting a geometric random modeling method and generating the backward scattering paths by adopting a geometric modeling method based on obtained sensing information parameters; weighted-summing the line-of-sight, the forward scattering paths, and the
(Continued)

backward scattering paths according to probabilities to obtain a complete communication channel impulse response.

7 Claims, 7 Drawing Sheets

(58) Field of Classification Search
USPC .......................................................... 342/52
See application file for complete search history.

(56) References Cited

U.S. PATENT DOCUMENTS

| | | | | |
|---|---|---|---|---|
| 9,453,905 | B2 * | 9/2016 | Smith | G01S 5/0273 |
| 11,246,010 | B2 * | 2/2022 | Mao | G01S 5/14 |
| 11,397,256 | B2 * | 7/2022 | Pandey | G01S 3/46 |
| 11,546,068 | B2 * | 1/2023 | Molisch | H04B 17/391 |
| 12,057,918 | B2 * | 8/2024 | Svendsen | H04B 7/0626 |
| 2011/0261905 | A1 * | 10/2011 | Shental | H04L 25/0202<br>375/316 |
| 2012/0069914 | A1 * | 3/2012 | Shental | H04L 25/0248<br>375/259 |
| 2016/0157828 | A1 * | 6/2016 | Sumi | A61B 8/4494<br>702/189 |
| 2019/0129026 | A1 * | 5/2019 | Sumi | G01S 7/52041 |
| 2022/0163579 | A1 * | 5/2022 | Li | G01R 29/0878 |
| 2024/0314001 | A1 * | 9/2024 | Yerramalli | G01S 5/0278 |
| 2025/0274309 | A1 * | 8/2025 | Xia | H04L 5/0048 |

FOREIGN PATENT DOCUMENTS

| | | | | |
|---|---|---|---|---|
| CN | 112235044 | B * | 12/2021 | H04B 10/503 |
| CN | 113992290 | A | 1/2022 | |
| CN | 115118368 | A | 9/2022 | |
| EP | 2854312 | A1 * | 4/2015 | H04B 17/318 |

* cited by examiner

INTEGRATED SENSING AND COMMUNICATION CHANNEL MODELING METHOD COMBINING FORWARD SCATTERING AND BACKWARD SCATTERING

TECHNICAL FIELD

The present disclosure belongs to the technical field of wireless communication and channel modeling, and especially relates to a novel integrated sensing and communication channel modeling method combining forward scattering and backward scattering.

BACKGROUND

With the rapid developments of wireless communication technology, the fifth generation (5G) mobile communication systems are gradually becoming mature, and higher application requirements and technical requirements are proposed for the sixth generation (6G) mobile communication systems. In order to further realize the 6G vision, both precise sensing and wide coverage communication need to be implemented by the wireless communication systems. In order to further improve the communication data rate, the carrier frequency of the wireless communication systems is developing towards a higher frequency band, and overlaps are generated with the frequency band used by the traditional sensing systems. In addition, there are many similarities between wireless communication systems and sensing systems in terms of hardware, data processing, and network architecture, which all provide possibilities for the emergence of integrated sensing and communication. Integrated sensing and communication refers to an integration of the wireless communication and the wireless sensing systems, achieving an efficient reuse of space-time-frequency resources, achieving high-precision sensing while achieving high-quality communication, and ultimately achieving mutual benefits between the two.

At present, researches on integrated sensing and communication mostly focus on the aspects of the transmitting waveform structure design, the beamforming algorithm design, and the receiving signal processing algorithm design, and there is still a lack of research on channel modeling. It is important to establish an effective and accurate channel model for system evaluations and optimizations in the integrated sensing and communication systems. Therefore, the present disclosure proposes a novel integrated sensing and communication channel modeling method combining forward scattering and backward scattering for the first time, which is necessary for further research on the 6G integrated sensing and communication system.

SUMMARY

In view of this, the objectives of the present disclosure are to provide a novel integrated sensing and communication channel modeling method combining forward scattering and backward scattering, to solve the problem of the lack of existing integrated sensing and communication channel research. This modeling method firstly obtains partial channel information through the sensing channel to assist the communication, and further establishes a communication channel model by using the sensed and obtained channel parameters to accurately analyze and describe the integrated sensing and communication channel.

In order to achieve the objectives mentioned above, the present disclosure adopts the following technical solutions.

Provided is a novel integrated sensing and communication channel modeling method combining forward scattering and backward scattering. The method includes the following steps.

In Step S1, an application scenario, antenna configurations of a base station terminal and a communication terminal of the application scenario are determined. The antenna configurations include the number of antenna array units, array forms, and sub-array arrangements.

In Step S2, the communication terminal and environmental scatterers are sensed by using a mono-static sensing type in view of the application scenario determined in Step S1.

In Step S3, positions and motion parameters for the communication terminal and the environmental scatterers are extracted according to a sensing channel impulse response sensed and obtained in Step S2. The positions and the motion parameters include a delay, an azimuth angle, an elevation angle, and a radial velocity of the communication terminal and the scatterers relative to the base station.

In Step S4, a geometric random modeling is performed on forward scattering paths at a non-line-of-sight in a communication channel. The Step S4 includes a scatterer distribution between the base station and the communication terminal is generated according to the application scenario determined in Step S1. The scatterer distribution includes the number of forward scattering clusters and the number of sub-paths within clusters; the departure angle, the arrival angle, the delay, and a path power of each of the sub-paths within each of the clusters.

In Step S5, a backward scattering path component at the non-line-of-sight and a line-of-sight component in the communication channel are geometrically modeled by using partial channel parameters sensed and obtained to sense auxiliary communication. For the backward scattering paths component, parameters for a link between the base station and the first bounce cluster are determined according to the partial channel parameters sensed and obtained, and the remaining parameters are randomly generated according to scenarios. The partial channel parameters include distance, angle, and motion speed parameters for the first bounce cluster relative to the base station. And the remaining parameters include distance, angle, and motion speed parameters for the last bounce cluster relative to the communication terminal, as well as parameters for a virtual link between the first bounce cluster and the last bounce cluster.

In Step S6, the existence probability of line-of-sight paths is determined according to the application scenario determined in Step S1. Corresponding probabilities of a forward scattering component and a backward scattering component are determined according to the number of clusters and the number of sub-paths within the clusters. Weighted sum of the line-of-sight path, forward scattering paths, and backward scattering paths based on probability to obtain the complete communication channel impulse response.

Further, in Step S1, the application scenario is determined as an outdoor vehicle-to-infrastructure scenario, a transmitting antenna array at the base station terminal is configured as a uniform array with $M_T$ antenna units, a receiving antenna array at the base station terminal is configured as a uniform array with $$M_R^S$$

antenna units, and similarly the communication terminal is configured as a uniform array with $$M_R^C$$

antenna units.

Further, Step S2 includes as follows.

In Step S201, a mono-static sensing system is constructed, in which both the transmitting antenna array and a receiving antenna array used for the mono-static sensing are positioned at a base station side, and the transmitting antenna transmits sensing signals and communication signals intermittently within different time slots.

In Step S202, when transmitting the sensing signals, positions and velocities of the communication terminal and the environmental scatterers are sensed through receiving antennas at the base station side by obtaining backward scattered sensing echo signals.

Further, Step S3 includes as follows.

After sensing by the mono-static sensing system at the base station side, a time instant t and a sensing channel impulse response corresponding to a delay τ are obtained, which are specifically expressed as:

$$h^{rad}(t,\tau)=\sqrt{G_0}\,e^{j2\pi f_{D0}(t)t}e^{j2\pi f_c\tau_0}A_{rad}(\theta_{A,L},\theta_{E,L})\cdot\delta(\tau-\tau_0)+\sum_{l=1}^{N_{up}^S(t)-1}\sum_{k=1}^{K_l}\sqrt{G_{l,k}}\,e^{j2\pi f_{Dl}(t)t}e^{j2\pi f_c\tau_{l,k}}A_{rad}(\theta_{A,k_l},\theta_{E,k_l})\cdot\delta(\tau-\tau_{l,k}),$$

where the first term and the second term at a right side of an equation denote the sensing channel impulse response of the communication terminal and the sensing channel impulse response of the environmental scatterers, respectively.

$$N_{up}^s(t)$$

denotes a total number of backward scattering clusters between the p-th transmitting antenna unit and a u-th receiving antenna unit at the time instant t, $K_l$ denotes a total number of scatterers in the l-th cluster, $G_0$ denotes a power attenuation factor between the base station and the communication terminal, and $G_{l,k}$ denotes a power attenuation factor between the base station and the environmental scatterers, respectively. $f_c$ denotes a carrier frequency, $f_{D0}(t)$ and $f_{Dl}(t)$ denote Doppler frequency shifts caused by movements of the communication terminal and the scatterers, respectively. $\tau_0$ denotes an echo delay between the base station and the communication terminal, and $\tau_{l,k}$ denotes an echo delay between the base station and the environmental scatterers, respectively. And $A_{rad}(\theta_{A,L},\theta_{E,L})$ denotes an antenna guidance vector in a case where an azimuth angle of the communication terminal relative to the base station is $\theta_{A,L}$ and an elevation angle of the communication terminal relative to the base station is $\theta_{E,L}$; $A_{rad}(\theta_{A,k_l},\theta_{E,k_l})$ denotes an antenna guidance vector in a case where an azimuth angle of the scatterers relative to the base station is $\theta_{A,k_l}$ and an elevation angle of the scatterers relative to the base station is $\theta_{E,k_l}$.

A delay $\tau_0$, the azimuth angle $\theta_{A,L}$, the elevation angle $\theta_{E,L}$, and Doppler parameters $f_{D0}(t)$ of the communication terminal relative to the base station are extracted from a sensing channel. And a distance $D_0$, the azimuth angle $\theta_{A,L}$, the elevation angle $\theta_{E,L}$, and a radial velocity $v_0(t)$ of the communication terminal relative to the base station are correspondingly obtained.

A delay $\tau_{l,k}$, the azimuth angle $\theta_{A,k_l}$, the elevation angle $\theta_{E,k_l}$, and Doppler parameters $f_{Dl}(t)$ of the scatterers relative to the base station are extracted from the sensing channel. And a distance $d_{l,k}$, the azimuth angle $\theta_{A,k_l}$, the elevation angle $\theta_{E,k_l}$, and a radial velocity $v_l(t)$ of the scatterers relative to the base station are correspondingly obtained.

Further, Step S4 includes the following steps.

A channel impulse response $$h_{qp}^{Nf}(t,\tau)$$

of the forward scattering component in the communication channel is modeled. A channel model for the forward scattering component is not capable of obtaining channel information by sensing, thus a geometric random modeling method is followed in the modeling, and the method includes the following steps.

In Step S401, the number of the forward scattering clusters $$N_{qp}^c(t)$$

and the number of sub-paths $M_n$ within the forward scattering clusters between the p-th transmitting antenna and the q-th receiving antenna are determined. An azimuth angle and an elevation angle of a departure (arrival) angle for the m-th sub-path within the n-th forward scattering cluster are determined and denoted as $$\phi_{A,m_n}^{T(R)}\text{ and }\phi_{E,m_n}^{T(R)},$$

respectively, according to an ellipsoidal scatterer distribution model.

In Step S402, a delay of the m-th sub-path within the n-th cluster between the p-th transmitting antenna and the q-th receiving antenna is denoted as:

$$\tau_{qp,m_n}(t)=d_{qp,m_n}(t)/c+\tilde{\tau}_{m_n},$$

where $\tilde{\tau}_{m_n}$ denotes a delay between the first scatterer and the last scatterer, $$d_{qp,m_n}(t)=\left|d_{p,m_n}^T(t)\right|+\left|d_{q,m_n}^R(t)\right|,$$

$$d_{p,m_n}^T(t)$$

denotes a distance vector from the p-th transmitting antenna to the first bounce cluster via the m-th sub-path, and $$d^R_{q,m_n}(t)$$

denotes a distance vector from the q-th receiving antenna to the last bounce cluster via the m-th sub-path. And calculation formulas for $$d^T_{p,m_n}(t) \text{ and } d^R_{q,m_n}(t)$$

are:

$$d^T_{p,m_n} = d^T_{m_n} - 1^T_p + \int_0^t v^{A_n}(t)dt,$$

$$d^R_{q,m_n} = d^R_{m_n} - 1^{Rc}_q + \int_0^t v^R(t) - v^{Z_n}(t)dt,$$

where $$d^T_{m_n}$$

denotes a distance vector from the first antenna of the transmitting terminal to the n-th cluster and $$d^R_{m_n}$$

denotes a distance vector from the first antenna of the receiving terminal to the n-th cluster via the m-th sub-path, $$l^T_p$$

denotes a distance vector from the first transmitting antenna to the p-th transmitting antenna, $$l^{Rc}_q$$

denotes a distance vector from the first receiving antenna to the q-th receiving antenna of the communication terminal. $v^R(t)$, $v^{A_n}(t)$ and $v^{Z_n}(t)$ denote motion velocity vectors of the communication terminal, the first bounce cluster, and the last bounce cluster, respectively.

$$d^{T(R)}_{m_n}$$

is specifically denoted as:

$$d^{T(R)}_{m_n} = d^{T(R)}_{m_n}\left[\cos(\phi^{T(R)}_{A,m_n})\cos(\phi^{T(R)}_{E,m_n}),\ \sin(\phi^{T(R)}_{A,m_n})\cos(\phi^{T(R)}_{E,m_n}),\ \sin(\phi^{T(R)}_{E,m_n})\right],$$

where $$d^{T(R)}_{m_n}$$

denotes the distance from the first transmitting antenna to the n-th cluster and the distance from the first receiving antenna to the n-th cluster via the m-th sub-path.

$\tilde{\tau}_{m_n}$ is denoted as:

$$\tilde{\tau}_{m_n} = \tilde{d}_{m_n}/c + \tau',$$

where $\tilde{d}_{m_n}$ denotes a linear distance between the first scatterer and the last scatterer, and $\tau'$ denotes a random variable that follows an exponential distribution.

In Step S403, a power of each path is expressed as:

$$P'_{pq,m_n} = \exp\left(-\tau_{pq,m_n}(t)\frac{r_\tau - 1}{r_\tau DS}\right)10^{\frac{-z_n}{10}},$$

where $r_\tau$ denotes a delay distribution proportional factor and is determined by a ratio of a standard deviation of the delay to a root mean square delay extension. DS denotes a root mean square delay extension, and $z_n$ denotes a shadow fading of the n-th cluster.

The power of each path after a normalization is recorded as:

$$P_{qp,m_n}(t) = P'_{qp,m_n}(t)/\sum_{n=1}^{N^c_{qp}(t)}\sum_{m=1}^{M_n} P'_{qp,m_n}(t),$$

and if the sub-paths within the clusters are distinguishable, the delay $\tau_{pq,m_n}(t)$ in the above equation is simplified as $\tau_{pq,n}(t)$, thus the power of the path is denoted as:

$$P'_{pq,m_n} = \frac{1}{M_n}\exp\left(-\tau_{pq,n}(t)\frac{r_\tau - 1}{r_\tau DS}\right)10^{\frac{-z_n}{10}}.$$

Further, Step S5 includes the following.

In Step S501, channel impulse response $$h^{Nb}_{qp}(t, \tau)$$

of the backward scattering component in the communication channel is modeled, which includes the following steps.

In Step S5011, the number of backward scattering clusters $$N^s_{qp}(t)$$

and the number of sub-paths within the backward scattering clusters $K_l$ between the p-th transmitting antenna and the q-th receiving antenna are determined. An azimuth angle and an elevation angle of departure (arrival) angle for the k-th sub-path within the l-th backward scattering cluster are denoted as $$\phi_{A,k_l}^{T(R)} \text{ and } \phi_{E,k_l}^{T(R)},$$

respectively.

In Step S5012, a delay of the k-th sub-path within the l-th cluster between the p-th transmitting antenna and the q-th receiving antenna is denoted as:

$$\tau_{qp,k_l}(t) = d_{qp,k_l}(t)/c + \tilde{\tau}_{k_l},$$

where $\tilde{\tau}_{k_l}$ denotes a delay between the first scatterer and the last scatterer, $$d_{qp,k_l}(t) = |d_{p,k_l}^T(t)| + |d_{q,k_l}^R(t)|,$$

$$d_{p,k_l}^T(t)$$

denotes a distance vector from the p-th transmitting antenna to the first bounce backward scatter cluster. And $$d_{q,k_l}^R(t)$$

denotes a distance vector from the q-th receiving antenna to the last bounce backward scatter cluster. And a calculation formula for $$d_{p,k_l}^T(t)$$

is:

$$d_{p,k_l}^T(t) = d_{k_l}^T - l_p^T + \int_0^t v^{A_l}(t)dt,$$

where $$d_{k_l}^T$$

denotes a distance vector from the first antenna of the transmitting terminal to the l-th backward scatter cluster via the k-th sub-path, $v^{A_l}(t)$ denotes a velocity vector of the first bounce backward scatter cluster at the base station side, and $$l_p^T$$

denotes a distance vector from the first transmitting antenna to the p-th transmitting antenna;

a specific expression for $$d_{k_l}^T$$

is:

$$d_{k_l}^T = d_{k_l}^T\left[\cos(\phi_{A,k_l}^T)\cos(\phi_{E,k_l}^T),\ \sin(\phi_{A,k_l}^T)\cos(\phi_{E,k_l}^T),\ \sin(\phi_{E,k_l}^T)\right],$$

where $$d_{k_l}^T$$

denotes a distance from the first transmitting antenna to the l-th cluster via the k-th sub-path.

In Step S5013, a mono-static sensing system at the base station side in an integrated sensing and communication system is deployed, thus a position of the first bounce backward scatter cluster and motion parameters at the base station side is provided by the sensing channel, which specifically includes the following parameters:

$$d_{k_l}^T = d_{l,k},\ \ \phi_{A,k_l}^T = \theta_{A,k_l},\ \ \phi_{E,k_l}^T = \theta_{E,k_l} \text{ and } v^{A_l}(t) = v_l(t),$$

where the left side of the equal sign denotes parameters for a backward scatter communication channel, and the right side of the equal sign denotes parameters for the sensing channel, a calculation for $$d_{q,k_l}^R(t)$$

is:

$$d_{q,k_l}^R(t) = d_{k_l}^R - l_q^{Rc} + \int_0^t v^R(t) - v^{Z_l}(t)dt,$$

where $$d_{k_l}^R = d_{k_l}^R\left[\cos(\phi_{A,k_l}^R)\cos(\phi_{E,k_l}^R),\ \sin(\phi_{A,k_l}^R)\cos(\phi_{E,k_l}^R),\ \sin(\phi_{E,k_l}^R)\right], \text{ and } d_{k_l}^R$$

denotes a distance from the first receiving antenna to the l-th cluster via the k-th sub-path.

In Step S5014, channel parameters for a link between the last bounce cluster and the q-th receiving antenna are generated according to the geometric random modeling method of the forward scattering component due to a lack of a sensing function at the communication terminal. And the parameters that are generated randomly include a distance parameter $$d_{k_l}^R,$$

angle parameters $$\phi^R_{A,k_l} \text{ and } \phi^R_{E,k_l},$$

as well as a velocity parameter $v^{Z_l}(t)$.

A delay $\tilde{\tau}_{k_l}=\tilde{d}_{k_l}/c+\tau'$ between the first scatterer and the last scatterer, as well as a power $P_{qp,k_l}(t)$ of each path also need to be correspondingly modeled according to a random parameter generation method in the forward scattering component.

In Step S502, a channel impulse response $$h^L_{qp}(t,\tau)$$

of the line-of-sight component in the communication channel is modeled, which specifically includes the following steps. Channel parameters for the line-of-sight paths between the p-th transmitting antenna and the q-th receiving antenna are calculated. An azimuth angle and an elevation angle of a departure angle for paths between the p-th transmitting antenna and the q-th receiving antenna are denoted as $$\phi^{T(R)}_{A,L} \text{ and } \phi^{T(R)}_{E,L},$$

respectively. And a delay thereof is denoted as:

$$\tau^L_{qp}(t) = D^c_{qp}(t)/c,$$

where a distance between the p-th transmitting antenna and the q-th receiving antenna is $$D^c_{qp}(t) = \left|D^c_{qp}(t)\right|,\ D^c_{qp}(t)$$

denotes a vector of the linear distance between the antennas. And the $$D^c_{qp}(t)$$

is specifically expressed as:

$$D^c_{qp}(t) = D + l^{Rc}_q - l^T_p + \int_0^t v^R(t)dt,$$

where $D=[D_0, 0,0]$ denotes a distance vector between the first transmitting antenna and the first receiving antenna.

$$D(D_0),\ v^R(t) = v_0(t),\ \phi^{T(R)}_{A,L} = \theta_{A,L} \text{ and } \phi^{T(R)}_{E,L} = \theta_{E,L}$$

are obtained from the sensing channel among the above parameters.

Further, Step S6 includes the following steps.

In Step S601, probabilities of three components, the line-of-sight component, the forward scattering component, and the backward scattering component are determined, which includes the following steps.

In Step S6011, firstly, the existence probability of the line-of-sight paths is modeled according to a specific scenario based on a 3GPP standardized document. And the existence probability of the line-of-sight paths are calculated according to the following formula:

$$p_L = \begin{cases} 1, & D_0 \le 18\text{ m} \\ \left[\frac{18}{D_0} + \left(1 - \frac{18}{D_0}\right)\exp\left(-\frac{D_0}{63}\right)\right]\cdot \\ \left(1 + C'(h_{UE})\frac{5}{4}\left(\frac{D_0}{100}\right)^3\cdot\exp\left(-\frac{D_0}{150}\right)\right), & D_0 > 18\text{ m} \end{cases},$$

where $h_{UE}$ denotes the height of the communication terminal and $C'(h_{UE})$ is calculated by the following formula:

$$C'(h_{UE}) = \begin{cases} 0, & h_{UE} \le 13\text{ m} \\ \left(\frac{h_{UE}-13}{10}\right)^{1.5}, & h_{UE} > 13\text{ m} \end{cases}.$$

In Step S6012, according to the number of clusters and the number of sub-paths within the clusters corresponding to the forward scattering component and the backward scattering component, the probabilities corresponding to the forward scattering component and the backward scattering component are determined. And a specific calculation means is as follows.

The probability corresponding to the forward scattering component is:

$$p^f_N(t) = \frac{N^c_{qp}(f)M_n}{N^c_{qp}(t)M_n + N^s_{qp}(t)K_l}.$$

The probability corresponding to the backward scattering component is:

$$p^f_N(t) = \frac{N^s_{qp}(t)K_l}{N^c_{qp}(t)M_n + N^s_{qp}(t)K_l}.$$

After obtaining the probabilities of each component, the line-of-sight component, a forward scattering path component, and the backward scattering component are weighted-summed according to the probabilities, to obtain an eventual communication channel impulse response.

In Step S602, the communication channel is modeled according to the probabilities of the line-of-sight component, the forward scattering component and the backward scattering component, as well as the channel impulse response obtained from Step S601, and Step S602 includes the following steps.

Due to the necessity of considering a path loss PL, a shadow fading SH, and a small-scale fading during the modeling for a communication channel model, a communication channel matrix is denoted as:

$$H = [PL \cdot SH]^{\frac{1}{2}} \cdot H_s,$$

where $$H_s = \left[h_{qp}^{com}(t, \tau)\right]_{M_R^C \times M_T}$$

denotes a small-scale fading matrix.

$$h_{qp}^{com}(t, \tau)$$

denotes a channel impulse response of the first transmitting antenna and the second receiving antenna at the time instant t and the delay t, and is represented as a superposition of the line-of-sight and the non-line-of-sight. The non-line-of-sight is further divided into the forward scattering component and the backward scattering component, thus $$h_{qp}^{com}(t, \tau)$$

is expressed as follows:

$$h_{qp}^{com}(t, \tau) = p_L(t) \cdot \sqrt{\frac{K}{K+1}} h_{qp}^L(t, \tau) + \sqrt{\frac{1}{K+1}} \left(p_N^f(t) \cdot h_{qp}^{Nf}(t, \tau) + p_N^b(t) \cdot h_{qp}^{Nb}(t, \tau)\right),$$

where K denotes a Rice factor, $p_L(t)$, $$p_N^f(t) \text{ and } p_N^b(t)$$

denote the probabilities of the line-of-sight component, the forward scattering component, and the backward scattering component, respectively. And $$h_{qp}^L(t, \tau), h_{qp}^{Nf}(t, \tau) \text{ and } h_{qp}^{Nb}(t, \tau)$$

denote the channel impulse responses of the line-of-sight component, the forward scattering component, and the backward scattering component, respectively.

The beneficial effects of the present disclosure are as follows.

In view of the novel integrated sensing and communication application scenario in 6G, the present disclosure proposes a novel integrated sensing and communication channel modeling method combining forward scattering and backward scattering suitable for this scenario for the first time. In this modeling method, the sensing channel is introduced on the basis of the traditional wireless communication channel modeling, and the forward scattering characteristics and the backward scattering characteristics of the sensing channel are introduced into the communication channel in consideration of the relevance between the sensing channel and the communication channel, therefore, the non-line-of-sight paths of the communication channel are further divided into two components: the forward scattering path and the backward scattering path, and the forward scattering path and the backward scattering path are weighted-summed according to the probabilities. Partial channel information can be obtained through the sensing channel, to sense the auxiliary communication. The channel parameters obtained by sensing can be used to assist communication channel modeling, which increases channel certainty, thus the communication channel is more accurate.

BRIEF DESCRIPTION OF THE DRAWINGS

FIG. 6(*a*) illustrates a fitting result diagram of a channel model simulation for a root mean square delay extension and actual measurement data in urban scenarios.

FIG. 6(*b*) illustrates a fitting result diagram of a channel model simulation for a root mean square delay extension and actual measurement data in Embodiment 1 of the present disclosure in suburban scenarios.

DETAILED DESCRIPTION OF THE EMBODIMENTS

In order to clarify the objectives, the technical solutions, and the advantages of the embodiments of the present disclosure, the technical solutions of the embodiments of present disclosure will be clearly and completely described in conjunction with the accompanying drawings. Obviously, the described embodiments are a part of the embodiments of the present disclosure, not all of them. Based on the embodiments in the present disclosure, all other embodiments obtained by a person skilled in the art without creative labor fall within the protection scope of the present disclosure.

Embodiment 1

Figure 1:
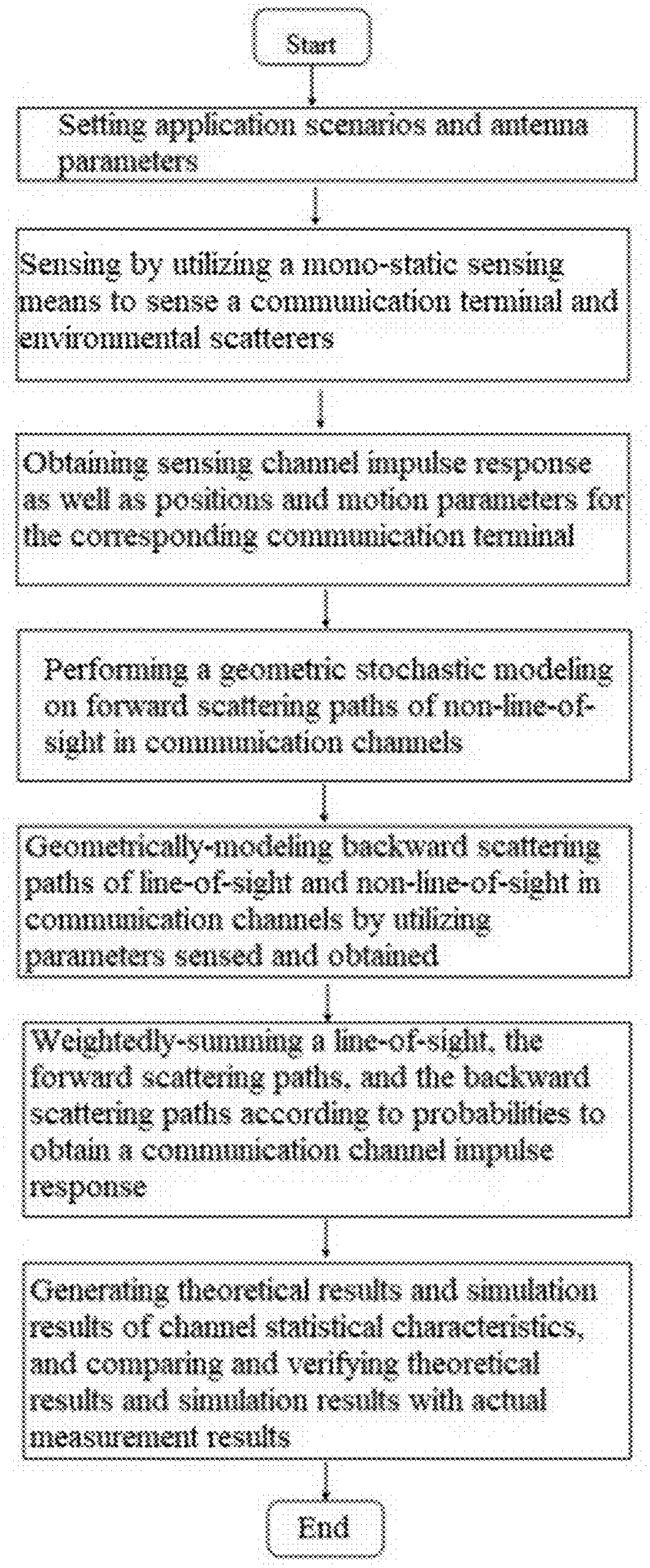
FIG. 1 illustrates a flow chart diagram of a novel integrated sensing and communication channel modeling method combining forward scattering and backward scattering provided in Embodiment 1.

With reference to FIG. 1 to FIG. 6, this embodiment provides a novel integrated sensing and communication channel modeling method combining forward scattering and backward scattering. The specific steps of this method are illustrated in FIG. 1, and the method includes the following steps.

In Step S1, an application scenario, antenna configurations of a base station terminal and a communication terminal of the application scenario are determined. The antenna configurations include the number of antenna array units, array forms, and sub-array arrangements.

Specifically, in this embodiment, the application scenario is determined as the outdoor vehicle-to-infrastructure (V2I) scenario, where a transmitting antenna array at the base station terminal is configured as a uniform array with $M_T$ antenna units, a receiving antenna array at the base station terminal is configured as a uniform array with $$M_R^S$$

antenna units, and similarly the communication terminal is configured as a uniform array with $$M_R^C$$

antenna units.

Figure 2:
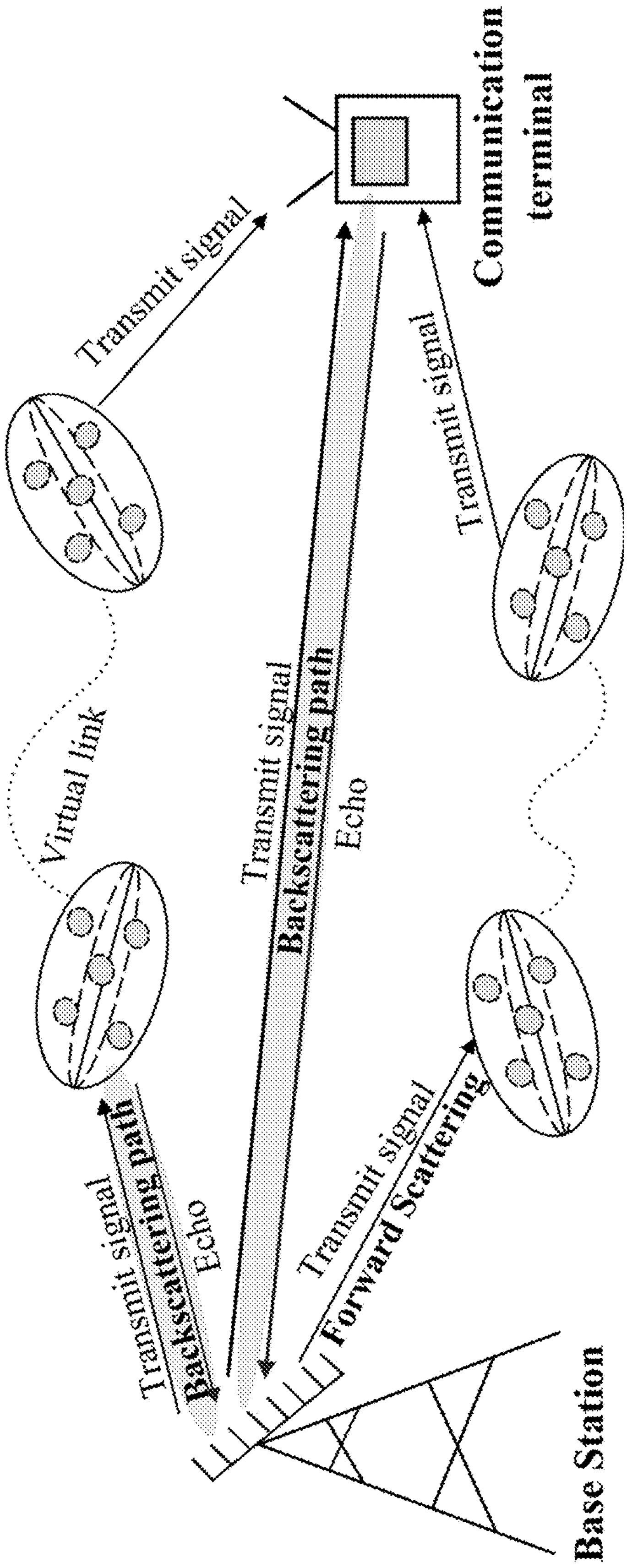
FIG. 2 illustrates a model diagram of an integrated sensing and communication system in Embodiment 1.
Figure 3:
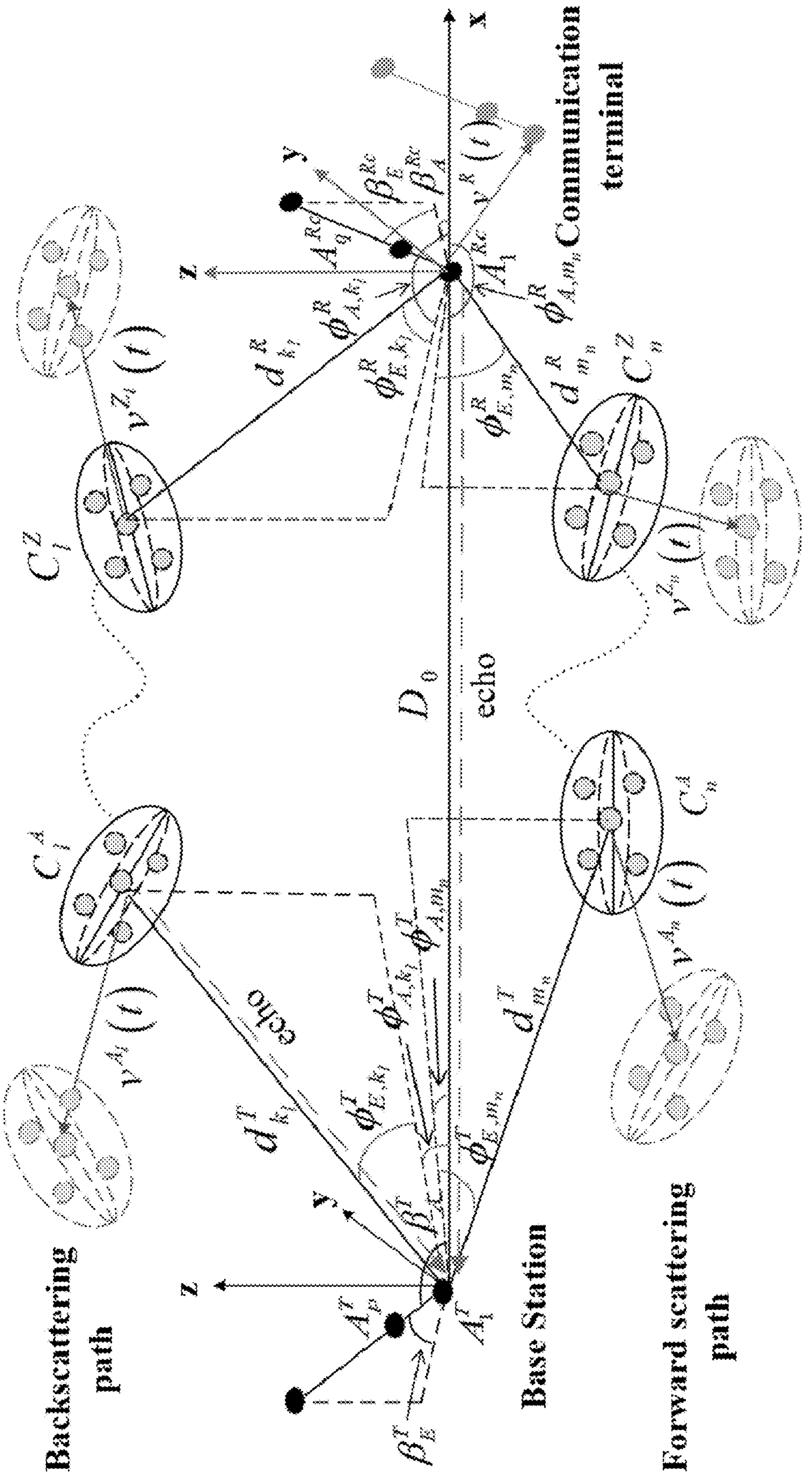
FIG. 3 illustrates a model diagram of an integrated sensing and communication channel in Embodiment 1.

More specifically, in this embodiment, the system model corresponding to this application scenario is illustrated in FIG. 2.

In Step 2, the communication terminal and environmental scatterers are sensed by using a mono-static sensing type.

Specifically, in this embodiment, Step S2 includes as follows.

In Step S201, a mono-static sensing system is constructed, in which both the transmitting antenna array and a receiving antenna array used for a mono-static sensing are positioned at a base station side, and the transmitting antenna transmits sensing signals and communication signals intermittently within different time slots.

In Step S202, when transmitting the sensing signals, positions and velocities of the communication terminal and the environmental scatterers are sensed through the receiving antenna at the base station side by obtaining backward scattered sensing echo signals.

It should be noted that the forward scattering refers to a scattering with a scattering angle less than 90° relative to the direction of beam incidence, which needs to be sensed through a bistatic (multi) station sensing system. The backward scattering refers to that a direction of the scattered wave is the scattering in the incident direction, which needs to be sensed through a mono-static sensing system.

In Step S3, the sensing channel impulse response is obtained and the positions and the motion parameters for the communication terminal and the environmental scatterers are extracted.

Specifically, in this embodiment, after sensing by the mono-static sensing system at the base station side, a time t and a sensing channel impulse response corresponding to a delay τ is obtained, which is specifically expressed as:

$$h^{rad}(t,\tau)=\sqrt{G_0}\,e^{j2\pi f_{D0}(t)t}e^{j2\pi f_c\tau_0}A_{rad}(\theta_{A,L},\theta_{E,L})\cdot\delta(\tau-\tau_0)+\sum_{l=1}^{N_{up}^S(t)-1}\sum_{k=1}^{K_l}\sqrt{G_{l,k}}\,e^{j2\pi f_{Dl}(t)t}e^{j2\pi f_c\tau_{l,k}}A_{rad}(\theta_{A,k_l},\theta_{E,k_l})\cdot\delta(\tau-\tau_{l,k}),$$

where the first term and the second term at a right side of an equation denote the sensing channel impulse response of the communication terminal and the sensing channel impulse response of the environmental scatterers, respectively.

$$N_{up}^s(t)$$

denotes a total number of backward scattering clusters between the p-th transmitting antenna unit and the u-th receiving antenna unit at the time t, $K_l$ denotes a total number of scatterers in the l-th cluster, $G_0$ denotes the power attenuation factor between the base station and the communication terminal, and $G_{l,k}$ denotes the power attenuation factor between the base station and the environmental scatterers, respectively. $f_c$ denotes a carrier frequency, $f_{D0}(t)$ and $f_{Dl}(t)$ denote Doppler frequency shifts caused by movements of the communication terminal and the scatterers, respectively. $\tau_0$ denotes an echo delay between the base station and the communication terminal, and $\tau_{l,k}$ denotes an echo delay between the base station and the environmental scatterers, respectively. And $A_{rad}(\theta_{A,L},\theta_{E,L})$ denotes an antenna guidance vector in a case where an azimuth angle of the communication terminal relative to the base station is $\theta_{A,L}$ and an elevation angle of the communication terminal relative to the base station is $\theta_{E,L}$. $A_{rad}(\theta_{A,k_l}),\theta_{E,k_l})$ denotes an antenna guidance vector in a case where an azimuth angle of the scatterers relative to the base station is $\theta_{A,k_l}$ and an elevation angle of the scatterers relative to the base station is $\theta_{E,k_l}$.

A delay $\tau_0$, the azimuth angle $\theta_{A,L}$, the elevation angle $\theta_{E,L}$, and Doppler parameters $f_{D0}(t)$ of the communication terminal relative to the base station can be extracted from a sensing channel. And a distance $D_0$, and a radial velocity $v_0(t)$ of the communication terminal relative to the base station can be further obtained from the delay and the Doppler parameters.

A delay $\tau_{l,k}$, the azimuth angle $\theta_{A,k_l}$, the elevation angle $\theta_{E,k_l}$, and Doppler parameters $f_{Dl}(t)$ of the scatterers relative to the base station can be extracted from the sensing channel. And a distance $d_{l,k}$, and a radial velocity $v_l(t)$ of the scatterers relative to the base station can be further obtained from the delay and the Doppler parameters.

In Step S4, a geometric random modeling is performed on forward scattering paths at a non-line-of-sight in a communication channel. And the Step S4 includes that a scatterer distribution between the base station and the communication terminal is generated according to the application scenario determined in Step S1, including the number of the scattering clusters, and parameters, such as the path power, the delay, the departure angle, and the arrival angle, in each of the sub-paths and each of the clusters.

Specifically, in this embodiment, Step S4 includes the following steps.

A channel impulse response $$h_{qp}^{Nf}(t,\tau)$$

of the forward scattering component in the communication channel is modeled. A channel model for the forward scattering component is not capable of obtaining channel information by sensing, thus a geometric random modeling method is followed in the modeling, and the method includes the following steps.

In Step S401, the number of the forward scattering clusters $$N_{qp}^{c}(t)$$

and the number of sub-paths $M_n$ within the forward scattering clusters between the p-th transmitting antenna and the q-th receiving antenna are determined. An azimuth angle and an elevation angle of a departure angle (an arrival angle) for the m-th sub-path within the n-th forward scattering cluster are determined and denoted as $$\phi_{A,m_n}^{T(R)} \text{ and } \phi_{E,m_n}^{T(R)},$$

respectively, according to an ellipsoidal scatterer distribution model.

In Step S402, a delay of the m-th sub-path within the n-th cluster between the p-th transmitting antenna and the q-th receiving antenna is denoted as:

$$T_{qp,m_n}(t) = d_{qp,m_n}(t) / c + \tilde{\tau}_{m_n},$$

where $\tilde{\tau}_{m_n}$ denotes a delay between the first scatterer and the last scatterer, c denotes the light speed, $$d_{qp,m_n}(t) = \left|d_{p,m_n}^{T}(t)\right| + \left|d_{q,m_n}^{R}(t)\right|, \; d_{p,m_n}^{T}(t)$$

denotes a distance vector from the p-th transmitting antenna to the first bounce cluster via the m-th sub-path, and $$d_{q,m_n}^{R}(t)$$

denotes a distance vector from the q-th receiving antenna to the last bounce cluster via the m-th sub-path. And calculation formulas for $$d_{p,m_n}^{R}(t) \text{ and } d_{q,m_n}^{R}(t)$$

are:

$$d_{p,m_n}^{T} = d_{m_n}^{T} - 1_{p}^{T} + \int_0^t v^{A_n}(t)dt,$$

$$d_{q,m_n}^{R} = d_{m_n}^{R} - 1_{q}^{Rc} + \int_0^t v^{R}(t) - v^{Z_n}(t)dt,$$

where $$d_{m_n}^{T(R)}$$

denotes a distance vector from the first antenna of the transmitting terminal to the n-th cluster and a distance vector from the first antenna of the receiving terminal to the n-th cluster via the m-th sub-path, T denotes the transmitting terminal, and R denotes the receiving terminal.

$$l_{p}^{T}$$

denotes a distance vector from the first transmitting antenna to the p-th transmitting antenna, $$l_{q}^{R_c}$$

denotes a distance vector from the first receiving antenna to the q-th receiving antenna. $v^R(t)$, $v^{A_n}(t)$ and $v^{Z_n}(t)$ denote motion velocity vectors of the communication terminal, the first bounce cluster, and the last bounce cluster, respectively.

$$d_{m_n}^{T(R)}$$

is specifically expressed as:

$$d_{m_n}^{T(R)} = d_{m_n}^{T(R)}\left[\cos\left(\phi_{A,m_n}^{T(R)}\right)\cos\left(\phi_{E,m_n}^{T(R)}\right), \sin\left(\phi_{A,m_n}^{T(R)}\right)\cos\left(\phi_{E,m_n}^{T(R)}\right), \sin\left(\phi_{E,m_n}^{T(R)}\right)\right],$$

where $$d_{m_n}^{T(R)}$$

denotes a distance from the first transmitting antenna to the n-th cluster and a distance from the first receiving antenna to the n-th cluster via the m-th sub-path.

More specifically, $\tilde{\tau}_{m_n}$ is denoted as:

$$\tilde{\tau}_{m_n} = \tilde{d}_{m_n} / c + \tau',$$

where $\tilde{d}_{m_n}$ denotes a distance between the first scatterer and the last scatterer, and $\tau'$ denotes a random variable that follows an exponential distribution.

In Step S403, a power of each path is expressed as:

$$P'_{pq,m_n} = \exp\left(-\tau_{pq,m_n}(t)\frac{r_\tau - 1}{r_\tau DS}\right)10^{\frac{-z_n}{10}},$$

where $r_\tau$ denotes a delay distribution proportional factor and is determined by a ratio of a standard deviation of the delay to a root mean square delay extension. DS denotes a root mean square delay extension, and $z_n$ denotes a shadow fading of the n-th cluster.

The power of each path after a normalization is recorded as:

$$P_{qp,m_n}(t) = P'_{qp,m_n}(t) \Big/ \sum_{n=1}^{N_{qp}^{C}(t)} \sum_{m=1}^{M_n} P'_{qp,m_n}(t),$$

and

If the sub-paths within the clusters are distinguishable, the delay $\tau_{pq,m_n}$ (t) in the above equation is simplified as $\tau_{pq,n}$(t), thus the power of the path is denoted as:

$$P'_{pq,m_n} = \frac{1}{M_n}\exp\left(-\tau_{pq,n}(t)\frac{r_\tau - 1}{r_\tau DS}\right)10^{\frac{-z_n}{10}}.$$

In Step S5, a backward scattering path component at the non-line-of-sight and a line-of-sight component in the communication channel are geometrically modeled by using partial channel parameters sensed and obtained to sense auxiliary communication. For the backward scattering paths component, parameters for a link between the base station and the first bounce cluster can be determined according to the sensing parameters obtained, and the remaining parameters are randomly generated according to scenarios.

Specifically, in this embodiment, Step S5 includes the following.

In Step S501, a channel impulse response $$h_{qp}^{Nb}(t, \tau)$$

of the backward scattering component in the communication channel is modeled, which includes the following steps.

In Step S5011, the number of backward scattering clusters $$N_{qp}^{s}(t)$$

and the number of sub-paths within the backward scattering clusters $K_l$ between the p-th transmitting antenna and the q-th receiving antenna are determined. An azimuth angle and an elevation angle of a departure angle (an arrival angle) for the k-th sub-path within the l-th backward scattering cluster are denoted as $$\phi_{A,k_l}^{T(R)} \text{ and } \phi_{E,k_l}^{T(R)},$$

respectively.

In Step S5012, a delay of the k-th sub-path within the l-th cluster between the p-th transmitting antenna and the q-th receiving antenna is denoted as:

$$\tau_{qp,k_l}(t) = d_{qp,k_l}(t)/c + \tilde{\tau}_{k_l},$$

where $\tilde{\tau}_{k_l}$ denotes as delay between the first scatterer and the last scatterer, $$d_{qp,k_l}(t) = |d_{p,k_l}^{T}(t)| + |d_{q,k_l}^{R}(t)|,\ d_{p,k_l}^{T}(t)$$

denotes a distance vector from the p-th transmitting antenna to the first bounce backward scatter cluster. And $$d_{q,k_l}^{R}(t)$$

denotes a distance vector from the q-th receiving antenna to the last bounce backward scatter cluster. And a calculation formula for $$d_{p,k_l}^{T}(t)$$

is:

$$d_{p,k_l}^{T}(t) = d_{k_l}^{T} - l_p^{T} + \int_0^T v^{A_l}(t)dt,$$

where $$d_{k_l}^{T}$$

denotes a distance vector from the first antenna of the transmitting terminal to the l-th backward scatter cluster via the k-th sub-path, $v^{A_l}$(t) denotes a velocity vector of the first bounce backward scatter cluster at the base station side, and $$l_p^{T}$$

denotes a distance vector from the first transmitting antenna to the p-th transmitting antenna;

a specific expression for $$d_{k_l}^{T}$$

is:

$$d_{k_l}^{T} = d_{k_l}^{T}\left[\cos(\phi_{A,k_l}^{T})\cos(\phi_{E,k_l}^{T}),\ \sin(\phi_{A,k_l}^{T})\cos(\phi_{E,k_l}^{T}),\ \sin(\phi_{E,k_l}^{T})\right],$$

where $$d_{k_l}^{T}$$

denotes a distance from the first transmitting antenna to the l-th cluster via the k-th sub-path.

Specifically, in this embodiment, a mono-static sensing system at the base station side in an integrated sensing and communication system is deployed, thus a position of the first bounce backward scatter cluster and motion parameters at the base station side is provided by the sensing channel, which specifically includes the following parameters:

$$d_{k_l}^{T} = d_{l,k},\ \phi_{A,k_l}^{T} = \theta_{A,k_l},\ \phi_{E,k_l}^{T} = \theta_{E,k_l} \text{ and } v^{A_l}(t) = v_l(t),$$

where the left side of the equal sign denotes parameters for a backward scatter communication channel, and the right side of the equal sign denotes parameters for the sensing channel.

Specifically, in this embodiment, a calculation for $$d^R_{q,k_1}(t)$$

can be:

$$d^R_{q,k_l}(t) = d^R_{k_l} - l^{Rc}_q + \int_0^t v^R(t) - v^{Z_l}(t)dt,$$

where $$d^R_{k_1} = d^R_{k_1}\left[\cos(\phi^R_{A,k_1})\cos(\phi^R_{E,k_1}),\ \sin(\phi^R_{A,k_1})\cos(\phi^R_{E,k_1}),\ \sin(\phi^R_{E,k_1})\right],$$

and $$d^R_{k_1}$$

denotes a distance from the first receiving antenna to the I-th cluster via the k-th sub-path.

Channel parameters for a link between the last bounce cluster and the q-th receiving antenna are generated according to the geometric random modeling method of the forward scattering component due to a lack of a sensing function at the communication terminal. And the parameters that are generated randomly include a distance parameter $$d^R_{k_1},$$

angle parameters $$\phi^R_{A,k_1} \text{ and } \phi^R_{E,k_1},$$

as well as a velocity parameter $v^{Z_1}(t)$. A delay $\tilde{\tau}_{k_l}=\tilde{d}_{k_l}/c+\tau'$ between the first scatterer and the last scatterer, as well as a power $P_{qp,k_l}(t)$ of each path also need to be correspondingly modeled according to a random parameter generation method in the forward scattering component.

In Step S502, a channel impulse response $$h^L_{qp}(t, \tau)$$

of the line-of-sight component in the communication channel is modeled, which specifically includes the following steps. Channel parameters for the line-of-sight paths between the p-th transmitting antenna and the q-th receiving antenna are calculated. An azimuth angle and an elevation angle of a departure angle for paths between the p-th transmitting antenna and the q-th receiving antenna are denoted as $$\phi^{T(R)}_{A,L} \text{ and } \phi^{T(R)}_{E,L},$$

respectively. And a delay thereof is denoted as:

$$\tau^L_{qp}(t) = D^c_{qp}(t)/c,$$

where a linear distance between antennas is $$D^c_{qp}(t) = \left|D^c_{qp}(t)\right|,\ D^c_{qp}(t)$$

denotes a vector of the linear distance between the antennas. And the $$D^c_{qp}(t)$$

is specifically expressed as:

$$D^c_{qp}(t) = D + l^{Rc}_q - l^T_p + \int_0^t v^R(t)dt,$$

where $D=[D_0, 0,0]$ denotes a distance vector between the first transmitting antenna and the first receiving antenna. Among the above parameters, $D(D_0)$, $v^R(t)=v_0(t)$, $$\phi^{T(R)}_{A,L} = \theta_{A,L} \text{ and } \phi^{T(R)}_{E,L} = \theta_{E,L}$$

are obtained from the sensing channel.

In Step S6, the existence probability of line-of-sight paths is determined according to the application scenario determined in Step S1. Corresponding probabilities of a forward scattering component and a backward scattering component are determined according to the number of clusters and the number of sub-paths within the clusters. And a line-of-sight, the forward scattering paths and the backward scattering paths are weighted-summed according to the probabilities, to obtain a complete communication channel impulse response.

Specifically, in this embodiment, Step S6 includes the following steps.

In Step S601, probabilities of three components, including the line-of-sight component, the forward scattering component, and the backward scattering component are determined, which specifically includes the following steps.

In Step S6011, firstly, the existence probability of the line-of-sight paths is modeled according to a specific scenario based on a 3GPP standardized document. And the existence probability of the line-of-sight paths is calculated according to the following formula:

$$p_L = \begin{cases} 1, & D_0 \le 18\text{ m} \\ \left[\frac{18}{D_0} + \left(1 - \frac{18}{D_0}\right)\exp\left(-\frac{D_0}{63}\right)\right] \cdot \left(1 + C'(h_{UE})\frac{5}{4}\left(\frac{D_0}{100}\right)^3 \cdot \exp\left(-\frac{D_0}{150}\right)\right), & D_0 > 18\text{ m} \end{cases},$$

where $h_{UE}$ denotes the height of the communication terminal and $C'(h_{UE})$ is calculated by the following formula:

$$C'(h_{UE}) = \begin{cases} 0, & h_{UE} \le 13 \text{ m} \\ \left(\frac{h_{UE} - 13}{10}\right)^{1.5}, & h_{UE} > 13 \text{ m} \end{cases}.$$

In Step S6012, according to the number of clusters and the number of sub-paths within the clusters corresponding to the forward scattering component and the backward scattering component, the probabilities corresponding to the forward scattering component and the backward scattering component are determined. And a specific calculation means is as follows.

The probability corresponding to the forward scattering component is:

$$p_N^f(t) = \frac{N_{qp}^c(t)M_n}{N_{qp}^c(t)M_n + N_{qp}^s(t)K_l}.$$

The probability corresponding to the backward scattering component is:

$$p_N^f(t) = \frac{N_{qp}^s(t)K_l}{N_{qp}^c(t)M_n + N_{qp}^s(t)K_l}.$$

After obtaining the probabilities of each component, the line-of-sight component, a forward scattering path component, and the backward scattering component are weighted-summed according to the probabilities, to obtain an eventual communication channel impulse response.

In Step S602, the communication channel is modeled according to the probabilities of the line-of-sight component, the forward scattering component and the backward scattering component, as well as the channel impulse response obtained from Step S601.

Specifically, Step S602 includes the following steps.

For a communication channel model, due to a necessity of considering a path loss PL, a shadow fading SH, and a small-scale fading during the modeling for a communication channel model, a communication channel matrix is denoted as:

$$H = [PL \cdot SH]^{\frac{1}{2}} \cdot H_s,$$

where $$H_s = \left[h_{qp}^{com}(t, \tau)\right]_{M_R^C \times M_T}$$

denotes a small-scale fading matrix.

$$h_{qp}^{com}(t, \tau)$$

denotes a channel impulse response of the first transmitting antenna and the second receiving antenna at the time instant t and the delay τ, and is represented as a superposition of the line-of-sight and the non-line-of-sight. The non-line-of-sight is further divided into the forward scattering component and the backward scattering component, thus $$h_{qp}^{com}(t, \tau)$$

is expressed as follows:

$$h_{qp}^{com}(t, \tau) = p_L(t) \cdot \sqrt{\frac{K}{K+1}} h_{qp}^L(t, \tau) + \sqrt{\frac{1}{K+1}} \left(p_N^f(t) \cdot h_{qp}^{Nf}(t, \tau) + p_N^b(t) \cdot h_{qp}^{Nb}(t, \tau)\right),$$

where K denotes a Rice factor, $p_L(t)$, $$p_N^f(t) \text{ and } p_N^b(t)$$

denote the probabilities of the line-of-sight component, the forward scattering component, and the backward scattering component, respectively. And $$h_{qp}^L(t, \tau),\ h_{qp}^{Nf}(t, \tau) \text{ and } h_{qp}^{Nb}(t, \tau)$$

denote the channel impulse responses of the line-of-sight component, the forward scattering component, and the backward scattering component, respectively.

In Step S7, theoretical results and simulation results of the channel statistical characteristics are generated, and are compared and verified with the actual measurement results.

Specifically, in this embodiment, a corresponding channel transferring function can be obtained as follows through the obtained channel impulse response.

$$H_{qp}(t, f) = p_L(t) \cdot \sqrt{\frac{K}{K+1}} H_{qp}^L(t, f) + \sqrt{\frac{1}{K+1}} \left(p_N^f(t) \cdot H_{qp}^{Nf}(t, f) + p_N^b(t) \cdot H_{qp}^{Nb}(t, f),\right.$$

where the transferring functions of the line-of-sight, the forward scattering, and the backward scattering are the Fourier transforms of the channel impulse responses of the three components, respectively. For ease of calculation, an antenna polarization is not included in the transferring function, and the transfer functions of the line-of-sight, the forward scattering, and the backward scattering components can be respectively expressed as follows.

$$H_{qp}^L(t, f) = \exp\{-j2\pi\tau_{qp}^L(t)(f - f_c)\},$$

$$H_{qp}^{Nf}(t, f) = \sum_{n=1}^{N_{qp}^c(f)} \sum_{m=1}^{M_n} \sqrt{P_{qp,m_n}(t)} \exp\{-j2\pi\tau_{qp,m_n}(t)(f - f_c)\},$$

$$H_{qp}^{Nb}(t, f) = \sum_{l=1}^{N_{qp}^s(t)} \sum_{k=1}^{K_l} \sqrt{P_{qp,k_l}(t)} \exp\{-j2\pi\tau_{qp,k_l}(t)(f - f_c)\},$$

where $$H_{qp}^L(t, f),\ H_{qp}^{Nf}(t, f) \text{ and } H_{qp}^{Nb}(t, f)$$

respectively denote the transfer functions of the line-of-sight, the forward scattering, and the backward scattering components.

Specifically, in this embodiment, the spatiotemporal correlation function of the communication channel can be expressed as:

$$R_{qp,\tilde{q}\tilde{p}}(t,f;\Delta r,\Delta t)=p_L(t)\cdot\frac{K}{K+1}R^{L}_{qp,\tilde{q}\tilde{p}}(t,f;\Delta r,\Delta t)+\frac{1}{K+1}\left(p_N^{f}(t)\cdot\sum_{n=1}^{N^{c}_{qp}(t)}R^{Nf}_{qp,\tilde{q}\tilde{p},n}(t,f;\Delta r,\Delta t)+p_N^{b}(t)\cdot\sum_{l=1}^{N^{s}_{qp}(t)}R^{Nb}_{qp,\tilde{q}\tilde{p},l}(t,f;\Delta r,\Delta t)\right),$$

where $$\Delta r=\{\Delta r^{T},\Delta r^{Rc}\},\ \Delta r^{T}=\delta^{T}_{\tilde{p}}-\delta^{T}_{p}$$

denotes an interval between the transmitting antenna unit p and p̃ at the base station side, and $$\Delta r^{Rc}=\delta^{Rc}_{\tilde{q}}-\delta^{Rc}_{q}$$

denotes an interval between the receiving antenna unit q and q̃ at the communication terminal side. The spatiotemporal correlation function corresponding to the line-of-sight component, the forward scattering component and the backward scattering component in the above formula can be respectively expressed as:

$$R^{L}_{qp,\tilde{q}\tilde{p}}(t,f;\Delta r,\Delta t)=E\{H^{L}_{qp}(t,f)H^{L*}_{\tilde{q}\tilde{p}}(t-\Delta t,f)\}=\left[P^{L}_{qp}(t)P^{L}_{\tilde{q}\tilde{p}}(t-\Delta t)\right]^{\frac{1}{2}}\cdot e^{j\frac{2\pi(f_c-f)}{\lambda fc}\left[D_{qp}(t)-D_{\tilde{q}\tilde{p}}(t-\Delta t)\right]},$$

$$R^{Nf}_{qp,\tilde{q}\tilde{p}}(t,f;\Delta r,\Delta t)=E\{H^{Nf}_{qp}(t,f)H^{Nf*}_{\tilde{q}\tilde{p}}(t-\Delta t,f)\}=E\left\{\sum_{m=1}^{M_n}\left[P_{qp,m_n}(t)P_{\tilde{q}\tilde{p},m_n}(t-\Delta t)\right]^{\frac{1}{2}}\cdot e^{j\frac{2\pi(f_c-f)}{\lambda fc}\left[d_{qp,m_n}(t)-d_{\tilde{q}\tilde{p},m_n}(t-\Delta t)\right]}\right\},\text{ and}$$

$$R^{Nb}_{qp,\tilde{q}\tilde{p}}(t,f;\Delta r,\Delta t)=E\{H^{Nb}_{qp}(t,f)H^{Nb*}_{\tilde{q}\tilde{p}}(t-\Delta t,f)\}=E\left\{\sum_{k=1}^{K_l}\left[P_{qp,k_l}(t)P_{\tilde{q}\tilde{p},k_l}(t-\Delta t)\right]^{\frac{1}{2}}\cdot e^{j\frac{2\pi(f_c-f)}{\lambda fc}\left[d_{qp,k_l}(t)-d_{\tilde{q}\tilde{p}k_l}(t-\Delta t)\right]}\right\}.$$

The spatial cross-correlation function can be obtained as follows by setting Δt=0.

$$R_{qp,\tilde{q}\tilde{p}}(t,f;\Delta r)=p_L(t)\cdot\frac{K}{K+1}R^{L}_{qp,\tilde{q}\tilde{p}}(t,f;\Delta r)+\frac{1}{K+1}\left(p_N^{f}(t)\cdot\sum_{n=1}^{N^{c}_{qp}(t)}R^{Nf}_{qp,\tilde{q}\tilde{p},n}(t,f;\Delta r)+p_N^{b}(t)\cdot\sum_{l=1}^{N^{s}_{qp}(t)}R^{Nb}_{qp,\tilde{q}\tilde{p},l}(t,f;\Delta r)\right),$$

The temporal autocorrelation function is obtained as follows by setting Δr=0.

$$R_{qp}(t,f;\Delta t)=p_L(t)\cdot\frac{K}{K+1}R^{L}_{qp}(t,f;\Delta t)+$$

-continued $$\frac{1}{K+1}\left(p_N^{f}(t)\cdot\sum_{n=1}^{N^{c}_{qp}(t)}R^{Nf}_{qp,n}(t,f;\Delta t)+p_N^{b}(t)\cdot\sum_{l=1}^{N^{s}_{qp}(t)}R^{Nb}_{qp,l}(t,f;\Delta t)\right),$$

Specifically, in this embodiment, the root mean square delay extension of the communication channel is a normalized second-order central moment that describes the time-varying delay power spectral density. Firstly, the delay power spectral density of the j-th path in forward scattering (assuming that there are J paths in all) can be expressed as:

$$PDP^{f}_{j}(t,\tau_j)=\left|h^{Nf}_{qp}(t,\tau_j)\right|^2.$$

The delay power spectral density of the i-th path in backward scattering (assuming that there are I paths in all) can be expressed as:

$$PDP^{b}_{i}(t,\tau_i)=\left|h^{Nb}_{qp}(t,\tau_i)\right|^2.$$

The root mean square delay extension of the integrated sensing and communication channel model can be recorded in the following form.

$$\tau_{rms}=p_N^{f}\cdot\tau^{f}_{rms}+p_N^{b}\cdot\tau^{b}_{rms},$$

where $$\tau^{f}_{rms}\text{ and }\tau^{b}_{rms}$$

denote the root mean square delay extensions of the forward scattering component and the backward scattering component respectively, and can be calculated as follows:

$$\tau^{f}_{rms}=\sqrt{\frac{\sum_{j}^{J}\left|h^{Nf}_{qp}(t,\tau_j)\right|^2.\tau_j^2}{\sum_{j}^{J}\left|h^{Nf}_{qp}(t,\tau_j)\right|^2}},\text{ and}$$

$$\tau^{b}_{rms}=\sqrt{\frac{\sum_{i}^{I}\left|h^{Nb}_{qp}(t,\tau_i)\right|^2.\tau_i^2}{\sum_{i}^{I}\left|h^{Nb}_{qp}(t,\tau_i)\right|^2}}.$$

In order to verify the practical value for a novel integrated sensing and communication channel modeling method combining forward scattering and backward scattering provided by the present disclosure, three simulation experiments are conducted in this embodiment, which are specifically as follows.

Experiment 1

Figure 4:
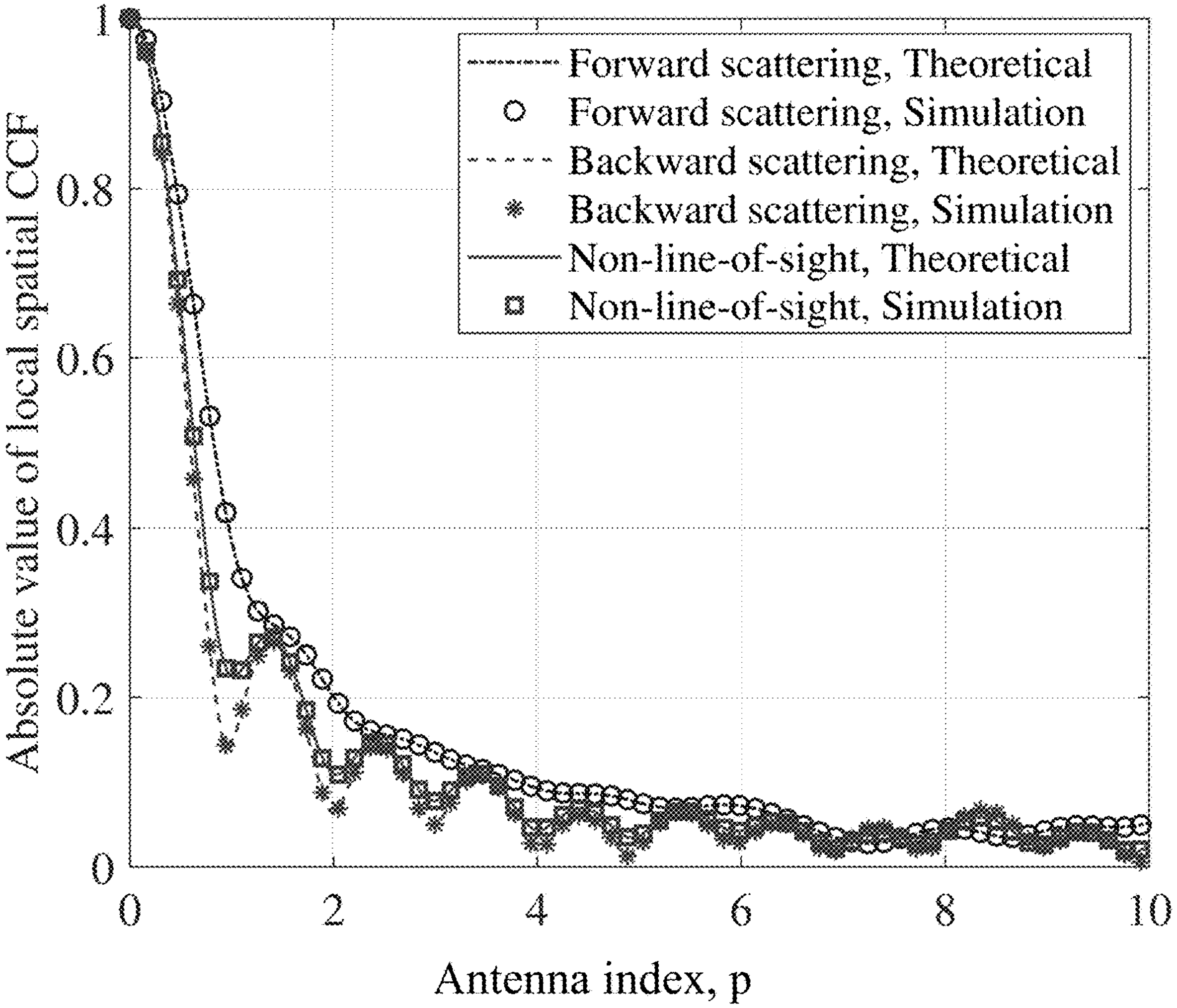
FIG. 4 illustrates a simulation result diagram of spatial cross correlation functions of a forward scattering component, a backward scattering component, and a non-line-of-sight component at a base station side in Embodiment 1.

The carrier frequency is set to 5.9 GHZ, with a linear distance of 150 meters between the base station and the communication terminal. The number of the transmitting antennas at the base station side is 16, and the number of the receiving antennas in the communication terminal is 4, with a motion speed of 10 m/s. Under the condition of a sparse distribution of the first bounce cluster at the base station side, the spatial cross-correlation functions of the forward scattering component, the backward scattering component, and the non-line-of-sight component of the transmitting terminal are simulated, and the simulation results are as illustrated in FIG. 4. The simulation results are in good agreement with the theoretical results, which proves the correctness of the modeling method proposed in the present disclosure.

Experiment 2

Figure 5:
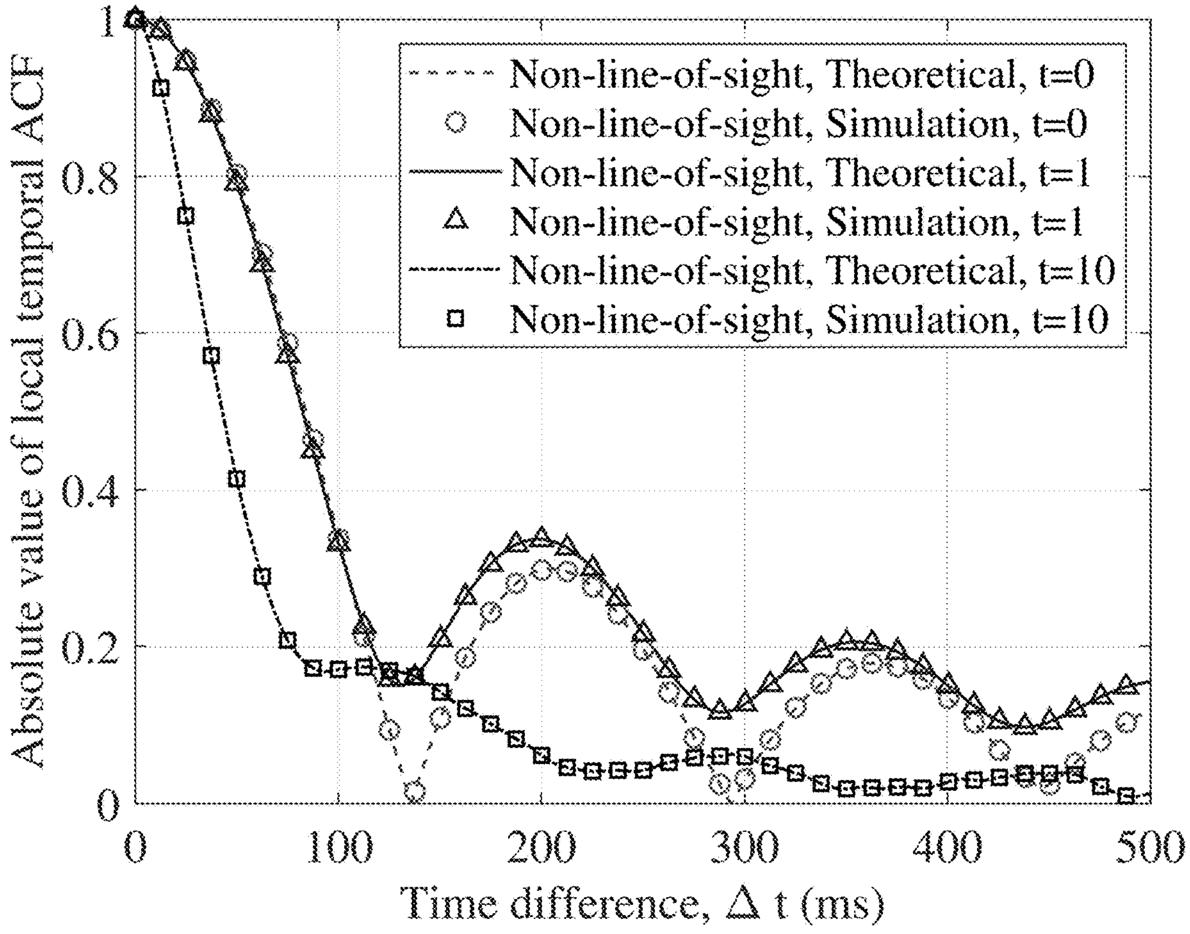
FIG. 5 illustrates a simulation result diagram of a temporal autocorrelation function of the non-line-of-sight component at different time instants in Embodiment 1.

The carrier frequency is set to 5.9 GHZ, with a linear distance of 150 meters between the base station and the communication terminal. The number of the transmitting antennas at the base station side is 16, and the number of the receiving antennas on the communication terminal is 4 with a motion speed of 10 m/s. The terporal autocorrelation functions of the channel model at different time instants are simulated, and the simulation results are as illustrated in FIG. 5. From the results, it can be found that the terporal autocorrelation functions of the time when t=0 s, t=1 s, and t=10 s are different, which are reflected in both forward and backward scattering channels, proving that the channel has time-domain non-stationary characteristics, and the simulation results are in good agreement with theoretical results, proving the correctness of the modeling method proposed in the present disclosure.

Experiment 3

Figure 6A:
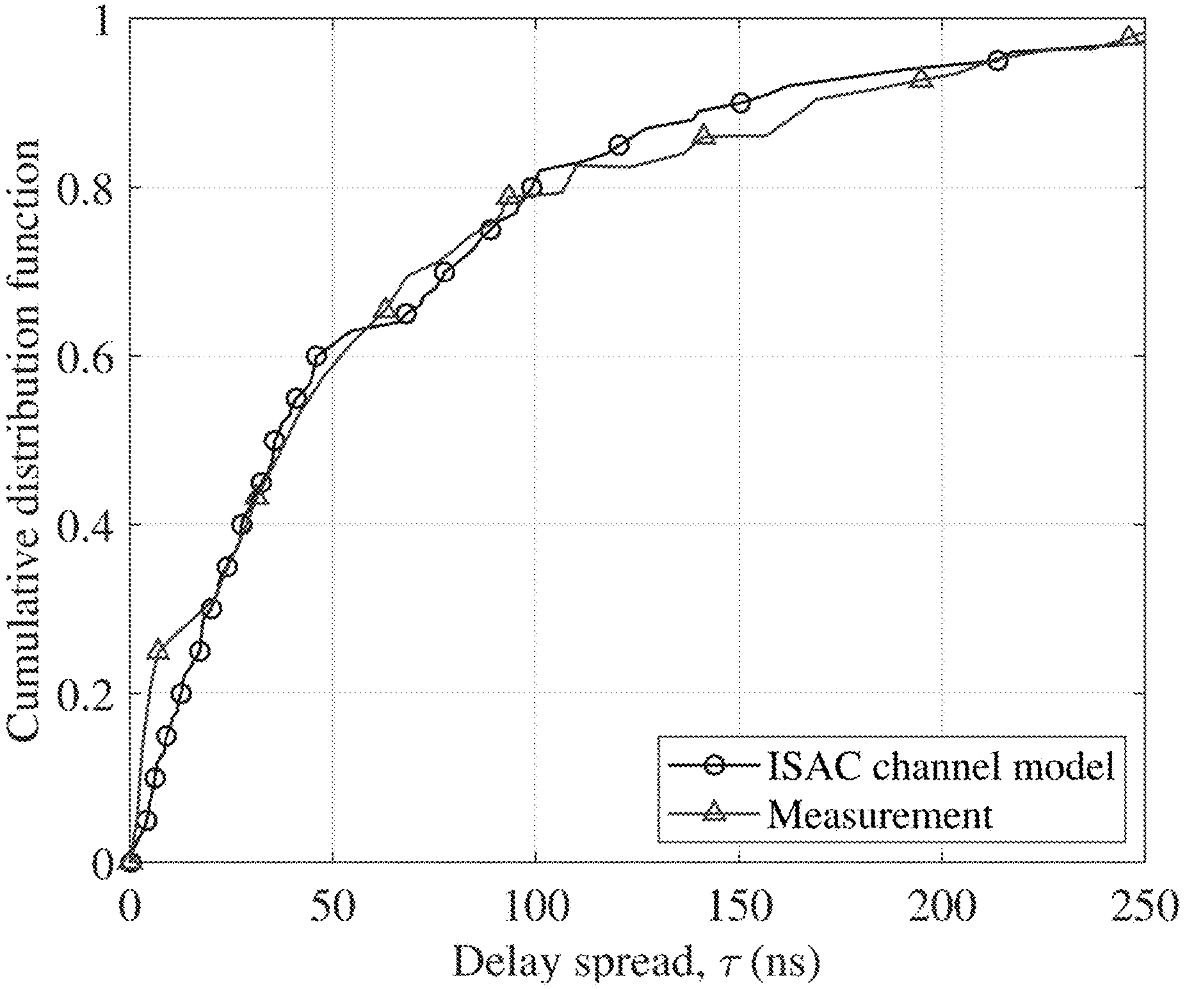
FIG. 6 illustrates a fitting result diagram of a channel model simulation for a root mean square delay extension and actual measurement data in Embodiment 1.
Figure 6B:
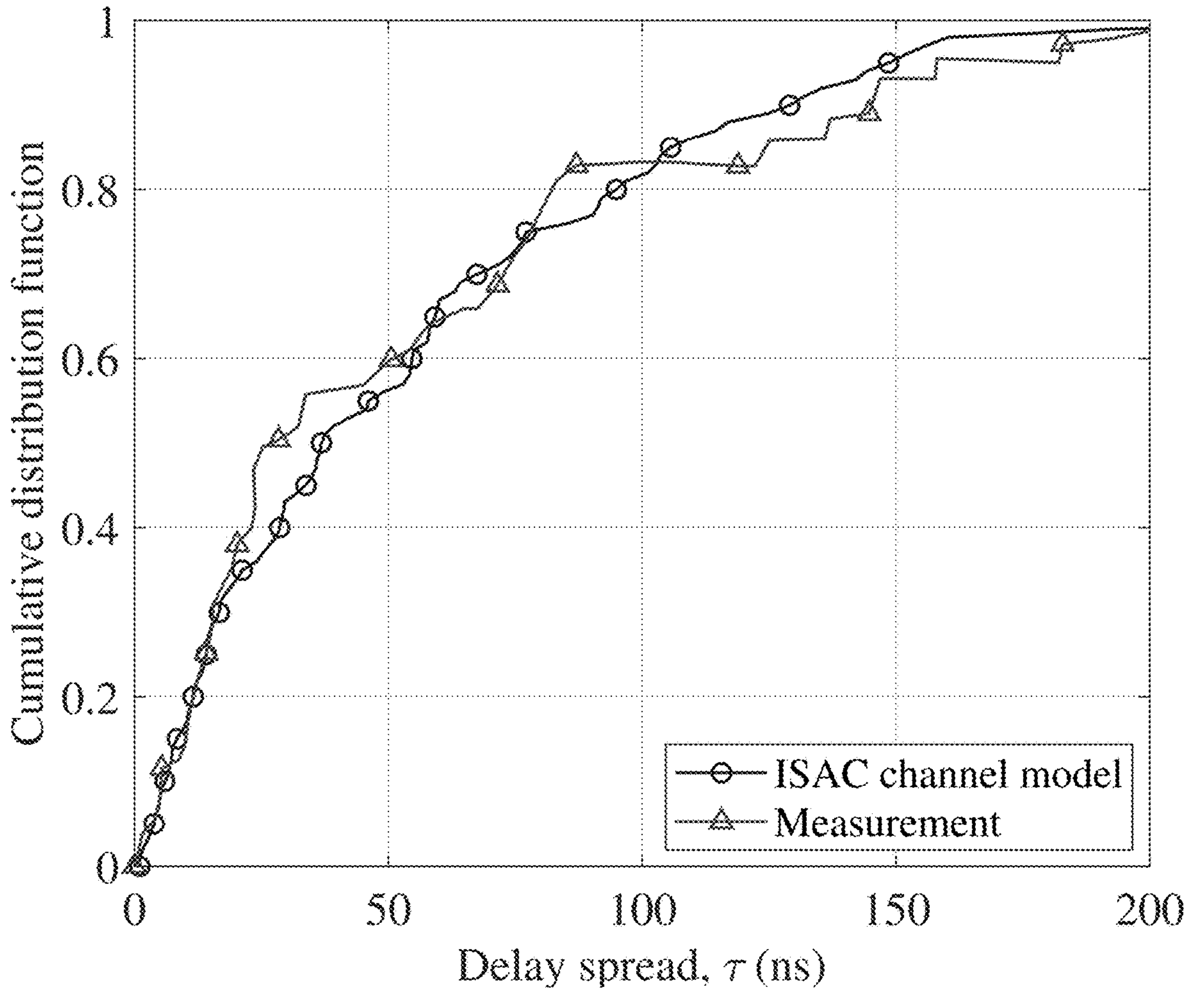

The carrier frequency is set to 5.9 GHZ, with a linear distance of 30 meters between the base station and the communication terminal. The number of the transmitting antennas at the base station side is 1, and the number of the receiving antennas on the communication terminal is 16. The root mean square delay extensions in the urban scenarios and the suburban scenarios are simulated respectively, which are fitted with the measurement data. And the results are as illustrated in FIG. 6. The FIG. 6(*a*) and FIG. 6(*b*) corresponds to the results of the root mean square delay extensions in the urban scenarios and the suburban scenarios, respectively. It can be found from the results that in the urban scenarios and the suburban scenarios, the simulation results of the channel model are in good agreement with the measurement results, proving the accuracy of the channel model.

The unspecified parts in the present disclosure are all the common sense for a person skilled in the art.

The preferred specific embodiments of the present disclosure are described in detail above. It should be understood that various amendments and changes can be made by an ordinary person skilled in the art according to the concept of the present disclosure with no creative efforts. Therefore, all technical solutions that can be obtained by a person skilled in the art based on the prior art according to the concept of the present disclosure through logical analysis, reasoning, or limited experiments should be within the protection scope determined by the claims.

What is claimed is:

1. A method implemented by a base station in an integrated sensing and communication system for channel modeling, the method combining forward scattering and backward scattering, wherein the method comprises following steps performed by the base station:

Step S1, determining, by the base station, an application scenario, antenna configurations of a base station terminal and a communication terminal of the application scenario, wherein the antenna configurations include a number of antenna array units, array forms, and subarray arrangements;

Step S2, sensing, by a mono-static radar system integrated into the base station and using a mono-static sensing type, the communication terminal and environmental scatterers in view of the application scenario determined in Step S1;

Step S3, extracting, by a processor of the base station according to a sensing channel impulse response sensed and obtained in Step S2, positions and motion parameters for the communication terminal and the environmental scatterers, wherein the positions and the motion parameters include: a delay, an azimuth angle, an elevation angle, and a radial velocity of the communication terminal and the scatterers relative to the base station;

Step S4, performing, by the processor, a geometric random modeling on forward scattering paths at a non-line-of-sight in a communication channel, including: generating, according to the application scenario determined in Step S1, a scatterer distribution between the base station and the communication terminal, wherein the scatterer distribution includes a number of forward scattering clusters and a number of sub-paths within clusters, the departure angle, the arrival angle, the delay, and a path power of each of the sub-paths within each of the clusters;

Step S5, geometrically-modeling, by the processor using partial channel parameters sensed and obtained to sense an auxiliary communication, a backward scattering path component at the non-line-of-sight and a line-of-sight component in the communication channel, wherein for the backward scattering path component, parameters for a link between the base station and a first bounce cluster are determined according to the partial channel parameters sensed and obtained, and remaining parameters are randomly generated according to scenarios; the partial channel parameters include a distance, an angle, and motion speed parameters for the first bounce cluster relative to the base station; and the remaining parameters include a distance, an angle, and motion speed parameters for a last bounce cluster relative to the communication terminal, as well as parameters for a virtual link between the first bounce cluster and the last bounce cluster; and Step S6, determining, by the processor according to the application scenario determined in Step S1, an existence probability of line-of-sight paths, determining, according to a number of the clusters and a number of the sub-paths within the clusters, corresponding probabilities of a forward scattering component and a backward scattering component, and weighted-summing, according to the probabilities, a line-of-sight, the forward scattering paths and the backward scattering paths, to obtain a complete communication channel impulse response, and configuring, based on the complete communication channel impulse response, a communication parameter for the base station or the communication terminal for subsequent data transmission.

2. The method according to claim 1, wherein in Step S1, the application scenario is determined as an outdoor vehicle-to-infrastructure scenario, an transmitting antenna array at the base station terminal is configured as a uniform array with $M_T$ antenna units, a receiving antenna array at the base station terminal is configured as a uniform array with $$M_R^S$$

antenna units, and similarly the communication terminal is configured as a uniform array with $$M_R^C$$

antenna units.

3. The method according to claim 1, wherein Step S2 includes:

Step S201, constructing a mono-static sensing system, in which both the transmitting antenna array and the receiving antenna array used for a mono-static sensing are positioned at a base station side, and the transmitting antenna transmits sensing signals and communication signals intermittently within different time slots; and Step S202, sensing, when transmitting the sensing signals, positions and velocities of the communication terminal and the environmental scatterers, through receiving antennas at the base station side by obtaining backward scattered sensing echo signals.

4. The method according to claim 3, wherein Step S3 includes:

obtaining, after sensing by the mono-static sensing system at the base station side, a sensing channel impulse response at time instant t and delay $\tau$ is specifically expressed as:

$$h^{rad}(t,\tau)=\sqrt{G_0}\,e^{j2\pi f_{Do}(t)t}e^{j2\pi f_c\tau_o}A_{rad}(\theta_{A,L},\theta_{E,L})\cdot\delta(\tau-\tau_0)+\sum_{l=1}^{N_{up}^s(t)-1}\sum_{k=1}^{K_l}\sqrt{G_{l,k}}\,e^{j2\pi f_{Dl}(t)t}e^{j2\pi f_c\tau_{l,k}}A_{rad}(\theta_{A,k_l},\theta_{E,k_l})\cdot\delta(\tau-\tau_{l,k}),$$

where a first term and a second term at a right side of an equation denote the sensing channel impulse response of the communication terminal and the sensing channel impulse response of the environmental scatterers, respectively;

$$N_{up}^s(t)$$

denotes a total number of backward scattering clusters between a p-th transmitting antenna unit and a u-th receiving antenna unit at the time instant t, $K_l$ denotes a total number of scatterers in a l-th cluster, $G_0$ denotes a power attenuation factor between the base station and the communication terminal, and $G_{l,k}$ denotes a power attenuation factor between the base station and the environmental scatterers, respectively, $f_c$ denotes a carrier frequency, $f_{D0}(t)$ and $f_{Dl}(t)$ denote Doppler frequency shifts caused by movements of the communication terminal and the scatterers, respectively, $\tau_0$ denotes an echo delay between the base station and the communication terminal, and $\tau_{l,k}$ denotes an echo delay between the base station and the environmental scatterers, respectively, and $A_{rad}(\theta_{A,L},\theta_{E,L})$ denotes an antenna guidance vector in a case where an azimuth angle of the communication terminal relative to the base station is $\theta_{A,L}$ and an elevation angle of the communication terminal relative to the base station $\theta_{E,L}$; $A_{rad}(\theta_{A,k_l},\theta_{E,k_l})$ denotes an antenna guidance vector in a case where an azimuth angle of the scatterers relative to the base station is $\theta_{A,k_l}$ and an elevation angle of the scatterers relative to the base station is $\theta_{E,k_l}$;

extracting a delay $\tau_0$, the azimuth angle $\theta_{A,L}$, the elevation angle $\theta_{E,L}$, and Doppler parameters $f_{D0}(t)$ of the communication terminal relative to the base station from a sensing channel, and correspondingly obtaining a distance $D_0$, the azimuth angle $\theta_{A,L}$, the elevation angle $\theta_{E,L}$, and a radial velocity $v_0(t)$ of the communication terminal relative to the base station; and extracting a delay $\tau_{l,k}$, the azimuth angle $\theta_{A,k_l}$, the elevation angle $\theta_{E,k_l}$, and Doppler parameters $f_{Dl}(t)$ of the scatterers relative to the base station from the sensing channel, and correspondingly obtaining a distance $d_{l,k}$, the azimuth angle $\theta_{A,k_l}$, the elevation angle $\theta_{E,k_l}$, and a radial velocity $v_l(t)$ of the scatterers relative to the base station.

5. The method according to claim 4, wherein Step S4 includes:

modeling a channel impulse response $$h_{qp}^{Nf}(t,\tau)$$

of the forward scattering component in the communication channel, wherein a channel model for the forward scattering component is not capable of obtaining channel information by sensing, thus a geometric random modeling method is followed in the modeling, and the method includes:

Step S401, determining a number of the forward scattering clusters $$h_{qp}^c(t)$$

and a number of sub-paths $M_n$ within the forward scattering clusters between a p-th transmitting antenna and a q-th receiving antenna, wherein an azimuth angle and an elevation angle of a departure angle for a m-th sub-path within a n-th forward scattering cluster are determined and denoted as $$\phi_{A,m_n}^{T(R)}\text{ and }\phi_{E,m_n}^{T(R)},$$

respectively, according to an ellipsoidal scatterer distribution model;

Step S402, denoting a delay of the m-th sub-path within the n-th cluster between the p-th transmitting antenna and the q-th receiving antenna as:

$$\tau_{qp,m_n}(t)=d_{qp,m_n}(t)/c+\tilde{\tau}_{m_n},$$

where $\tilde{\tau}_{m_n}$ denotes a delay between a first scatterer and a last scatterer, $$d_{qp,m_n}(t)=\left|d^T_{p,m_n}(t)\right|+\left|d^T_{q,m_n}(t)\right|,\ d^T_{p,m_n}(t)$$

denotes a distance vector from the p-th transmitting antenna to the first bounce cluster, and $$d^T_{q,m_n}(t)$$

denotes a distance vector from the q-th receiving antenna to the last bounce cluster; and calculation formulas for $$d^T_{p,m_n}(t) \text{ and } d^T_{q,m_n}(t)$$

are:

$$d^T_{p,m_n}=d^T_{m_n}-1^T_p+\int_0^t v^{A_n}(t)dt,$$

$$d^R_{q,m_n}=d^R_{m_n}-1^{R_c}_q+\int_0^t v^R(t)-v^{Z_n}(t)dt,$$

where $$d^{T(R)}_{m_n}$$

denotes a distance vector from a first antenna of the transmitting terminal to the n-th cluster and a distance vector from a first antenna of the receiving terminal to the n-th cluster via the m-th sub-path $$l^T_p$$

denotes a distance vector from a first transmitting antenna to the p-th transmitting antenna, $$l^{R_c}_q,$$

denotes a distance vector from a first receiving antenna of an antenna of the communication terminal to the q-th receiving antenna of the antenna of the communication terminal, and $v^R(t)$, $v^{A_n}(t)$ and $v^{Z_n}(t)$ denote motion velocity vectors of the communication terminal, the first bounce cluster, and the last bounce cluster, respectively;

wherein $$d^{T(R)}_{m_n}$$

specifically expressed as:

$$d^{T(R)}_{m_n}=d^{T(R)}_{m_n}\left[\cos\left(\phi^{T(R)}_{A,m_n}\right)\cos\left(\phi^{T(R)}_{E,m_n}\right),\ \sin\left(\phi^{T(R)}_{A,m_n}\right)\cos\left(\phi^{T(R)}_{E,m_n}\right),\ \left(\phi^{T(R)}_{E,m_n}\right)\right],$$

where $$d^{T(R)}_{m_n}$$

denotes a distance from the first transmitting antenna to the n-th cluster and a distance from the first receiving antenna to the n-th cluster via the m-th sub-path;

$\tilde{\tau}_{m_n}$ is expressed as:

$$\tilde{\tau}_{m_n}=\tilde{d}_{m_n}/c+\tau',$$

where $\tilde{d}_{m_n}$ denotes a linear distance between the first scatterer and the last scatterer, and $\tau'$ denotes a random variable that follows an exponential distribution; and Step S403, denoting a power of each path as:

$$P'_{pq,m_n}=\exp\left(-\tau_{pq,m_n}(t)\frac{r_\tau-1}{r_\tau DS}\right)10^{\frac{-z_n}{10}},$$

where $r_\tau$ denotes a delay distribution proportional factor and is determined by a ratio of a standard deviation of the delay to a root mean square delay extension, DS denotes a root mean square delay extension, and $z_n$ denotes a shadow fading of the n-th cluster; and the power of the each path after a normalization is recorded as:

$$P_{qp,m_n}(t)=P'_{qp,m_n}(t)\Big/\sum_{n=1}^{N^c_{qp}(t)}\sum_{m=1}^{M_n}P'_{qp,m_n}(t),$$

and simplifying, if the sub-paths within the e, the delay $\tau_{pq,m_n}(t)$ in the above equation as $\tau_{pq,n}(t)$, thus denoting the power of the path as:

$$P'_{pq,m_n}=\frac{1}{M_n}\exp\left(-\tau_{pq,n}(t)\frac{r_\tau-1}{r_\tau DS}\right)10^{\frac{-z_n}{10}}.$$

6. The method according to claim 5, wherein Step S5 includes:

Step S501: modeling a channel impulse response $$h^{Nb}_{qp}(t,\tau)$$

of the backward scattering component in the communication channel, including:

Step S5011: determining a number of backward scattering clusters $$N^s_{qp}(t)$$

and a number of sub-paths within the backward scattering clusters $K_l$ between the p-th transmitting antenna and the q-th receiving antenna, wherein an azimuth angle and an elevation angle of a departure angle for a k-th sub-path within a l-th backward scattering cluster are denoted $$\phi_{A,k_l}^{T(R)} \text{ and } \phi_{E,k_l}^{T(R)},$$

respectively;

Step S5012, denoting a delay of the k-th sub-path within the l-th cluster between the p-th transmitting antenna and the q-th receiving antenna as:

$$\tau_{qp,k_l}(t) = d_{qp,k_l}(t)/c + \tilde{\tau}_{k_l},$$

where $\tilde{\tau}_{k_l}$ denotes a delay between a first scatterer and a last scatterer, $$d_{qp,k_l}(t) = \left|d_{p,k_l}^T(t)\right| + \left|d_{q,k_l}^R(t)\right|, \; d_{p,k_l}^T(t)$$

denotes a distance vector from the p-th transmitting antenna to a first bounce backward scatter cluster, and $$d_{q,k_l}^R(t)$$

denotes a distance vector from the q-th receiving antenna to a last bounce backward scatter cluster; and a calculation formula for $$d_{p,k_l}^T(t)$$

is:

$$d_{k_l}^T = d_{k_l}^T\left[\cos\left(\phi_{A,k_l}^T\right)\cos\left(\phi_{E,k_l}^T\right), \sin\left(\phi_{A,k_l}^T\right)\cos\left(\phi_{E,k_l}^T\right), \sin\left(\phi_{E,k_l}^T\right)\right],$$

where $$d_{k_l}^T$$

denotes a distance vector from a first transmitting terminal to the l-th backward scatter cluster via the k-th sub-path, $v^{A_L}(t)$ denotes a velocity vector of the first bounce backward scatter cluster at the base station side, and $$l_p^T$$

denotes a distance vector from the first transmitting antenna to the p-th transmitting antenna;

a specific expression for $$d_{k_l}: \text{is:}$$

$$d_{k_l}^T = d_{k_l}^T\left[\cos\left(\phi_{A,k_l}^T\right)\cos\left(\phi_{E,k_l}^T\right), \sin\left(\phi_{A,k_l}^T\right)\cos\left(\phi_{E,k_l}^T\right), \sin\left(\phi_{E,k_l}^T\right)\right],$$

where $$d_{k_l}^T$$

denotes a distance from the first transmitting antenna to the l-th cluster via the k-th sub-path;

Step S5013, deploying a mono-static sensing system at the base station side in an integrated sensing and communication system, thus providing, by the sensing channel, a position of the first bounce backward scatter cluster and motion parameters at the base station side, specifically including following parameters:

$$d_{k_l}^T = d_{l,k}, \; \phi_{A,k_l}^T = \theta_{A,k_l}, \; \phi_{E,k_l}^T = \theta_{E,k_l} \text{ and } v^{A_l}(t) = v_l(t),$$

where a left side of an equal sign denotes parameters for a backward scatter communication channel, and a right side of the equal sign denotes parameters for the sensing channel;

a calculation for $$d_{q,k_l}^R(t)$$

is:

$$d_{q,k_l}^R(t) = d_{k_l}^R - l_q^{Rc} + \int_0^t v^R(t) - v^{z_l}(t)dt,$$

where $$d_{k_l}^R = d_{k_l}^R\left[\cos\left(\phi_{A,k_l}^R\right)\cos\left(\phi_{E,k_l}^R\right), \sin\left(\phi_{A,k_l}^R\right)\cos\left(\phi_{E,k_l}^R\right), \sin\left(\phi_{E,k_l}^R\right)\right], \; d_{k_l}^R$$

denotes a distance from the first receiving antenna to the l-th cluster via the k-th sub-path;

Step S5014, generating, according to the geometric random modeling method of the forward scattering component, channel parameters for a link between the last bounce cluster and the q-th receiving antenna due to a lack of a sensing function at the communication terminal, wherein the parameters that are generated randomly include a distance parameter $$d_{k_l}^T,$$

angle parameters $$\phi^R_{A,k_l} \text{ and } \phi^R_{E,k_l}$$

as well as a velocity parameter $v^{Z_l}(t)$, wherein a delay $\tilde{\tau}_{k_l}=\tilde{d}_{k_l}/c+\tau'$ between the first scatterer and the last scatterer, as well as a power $P_{qp,k_l}(t)$ of each path also need to be correspondingly modeled according to a random parameter generation method in the forward scattering component, and Step S502, modeling a channel impulse response $$h^L_{qp}(t,\tau)$$

of the line-of-sight component in the communication channel, specifically including: calculating channel parameters for the line-of-sight paths between the p-th transmitting antenna and the p-th receiving antenna, and denoting an azimuth angel and an elevation angle of a departure angle for paths between the p-th transmitting antenna and the q-th receiving antenna as $$\phi^{T(R)}_{A,L} \text{ and } \phi^{T(R)}_{E,L},$$

respectively, and denoting a delay thereof as:

$$\tau^L_{qp}(t) = D^c_{qp}(t)/c,$$

where a linear distance between antennas is $$D^c_{qp}(t) = |D^c_{qp}(t)|, D^c_{qp}(t)$$

denotes a vector of the linear distance between the antennas, and the $$D^c_{qp}(t)$$

is specifically expressed as:

$$D^c_{qp}(t) = D + l^{Rc}_q - l^T_p + \int_0^\tau v^R(t)dt,$$

denotes a distance vector between the first transmitting antenna and the first receiving antenna, D $$D(D_0),\ v^R(t) = v(t),\ \phi^{T(R)}_{A,L} = \theta_{A,L} \text{ and } \phi^{T(R)}_{E,L} = \theta_{E,L},$$

and are obtained from the sensing channel among the above parameters.

7. The method according to claim 6, wherein Step S6 includes:

Step S601, determining probabilities of three components, the line-of-sight component, the forward scattering component, and the backward scattering component, including:

Step S6011, firstly modeling, according to a specific scenario, the existence probability of the line-of-sight paths based on a 3GPP standardized document, and calculating, according to a following formula, the existence probability of the line-of-sight paths:

$$p_L = \begin{cases} 1, & D_0 \le 18 \text{ m} \\ \left[\frac{18}{D_0} + \left(1 - \frac{18}{D_0}\right)\exp\left(-\frac{D_0}{63}\right)\right] \cdot & D_0 > 18 \text{ m} \\ \left(1 + C'(h_{UE})\frac{5}{4}\left(\frac{D_0}{100}\right)^3 \cdot \exp\left(-\frac{D_0}{150}\right)\right), & \end{cases},$$

where, $h_{UE}$ denotes a height of the communication terminal and $C'(h_{UE})$ is calculated by a following formula:

$$C'(h_{UE}) = \begin{cases} 0, & h_{UE} \le 13 \text{ m} \\ \left(\frac{h_{UE}-13}{10}\right)^{1.5}, & h_{UE} > 13 \text{ m} \end{cases},$$

Step S6012, determining, according to the number of the clusters and the number of the sub-paths within the clusters corresponding to the forward scattering component and the backward scattering component, the probabilities corresponding to the forward scattering component and the backward scattering component, wherein a specific calculation means is as follows:

the probability corresponding to the forward scattering component is:

$$p^f_N(t) = \frac{N^c_{qp}(t)M_n}{N^c_{qp}(t)M_n + N^S_{qp}(t)K_l},$$

and the probability corresponding to the backward scattering component is:

$$p^f_N(t) = \frac{N^s_{qp}(t)K_l}{N^c_{qp}(t)M_n + N^S_{qp}(t)K_l},$$

weightedly-summing, after obtaining the probabilities of the each component, the line-of-sight component, a forward scattering path component, and the backward scattering component according to the probabilities, to obtain an eventual communication channel impulse response; and Step S602, modeling, according to the probabilities of the line-of-sight component, the forward scattering component and the backward scattering component, as well as the channel impulse response obtained from Step S601, the communication channel, including:

due to a necessity of considering a path loss PL, a shadow fading SH, and a small-scale fading during the modeling for a communication channel model, denoting a communication channel matrix as:

$$H=[PL\cdot SH]^{\frac{1}{2}}\cdot H_s,$$

Where $$H_s=\left[h_{qp}^{com}(t,\tau)\right]_{M_R^C\times M_T}$$

denotes a small-scale fading matrix, $$h_{qp}^{com}(t,\tau)$$

denotes a channel impulse response of the first transmitting antenna and the second receiving antenna at the time instant t and the delay r, and is represented as a superposition of the line-of-sight and the non-line-of-sight, wherein the non-line-of-sight is further divided into the forward scattering component, and the backward scattering component, thus $$h_{qp}^{com}(t,\tau)$$

is expressed as follows:

$$h_{qp}^{com}(t,\tau)=p_L(t)\cdot\sqrt{\frac{K}{K+1}}\,h_{qp}^{L}(t,\tau)+\sqrt{\frac{1}{K+1}}\left(p_N^f(t)\cdot h_{qp}^{Nf}(t,\tau)+p_N^b(t)\cdot h_{qp}^{Nb}(t,\tau)\right),$$

where K denotes a Rice factor, $p_L(t)$, $$p_N^f(t)\text{ and }p_N^b(t)$$

denote the probabilities of the line-of-sight component, the forward scattering component, and the backward scattering component, respectively; and $$h_{qp}^{L}(t,\tau),\ h_{qp}^{Nf}(t,\tau)\text{ and }h_{qp}^{Nb}(t,\tau)$$

denote the channel impulse responses of the line-of-sight component, the forward scattering component, and the backward scattering component, respectively.

* * * * *